(12) United States Patent
Fujita et al.

(10) Patent No.: US 9,659,243 B2
(45) Date of Patent: May 23, 2017

(54) IMAGE FORMING APPARATUS AND METHOD FOR DRIVING LIGHT SOURCE

(71) Applicants: Hayato Fujita, Kanagawa (JP); Masaaki Ishida, Kanagawa (JP); Atsufumi Omori, Kanagawa (JP); Muneaki Iwata, Kanagawa (JP)

(72) Inventors: Hayato Fujita, Kanagawa (JP); Masaaki Ishida, Kanagawa (JP); Atsufumi Omori, Kanagawa (JP); Muneaki Iwata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/048,240

(22) Filed: Feb. 19, 2016

(65) Prior Publication Data

US 2016/0247050 A1 Aug. 25, 2016

(30) Foreign Application Priority Data

Feb. 20, 2015 (JP) .................................. 2015-032324
Feb. 17, 2016 (JP) .................................. 2016-028148

(51) Int. Cl.
*G06K 15/02* (2006.01)
*H04N 1/00* (2006.01)

(52) U.S. Cl.
CPC ........... *G06K 15/1873* (2013.01); *H04N 1/00* (2013.01); *G06K 2215/0057* (2013.01)

(58) Field of Classification Search
CPC ....... G06K 15/1873; G06K 2215/0057; H04N 1/00

(Continued)

(56) References Cited

U.S. PATENT DOCUMENTS 6,498,617 B1 12/2002 Ishida et al.
8,212,847 B2 * 7/2012 Kella ................. H04N 1/40025
347/131

(Continued)

FOREIGN PATENT DOCUMENTS

JP 2004-354986 A 12/2004
JP 2005-193540 A 7/2005

(Continued)

OTHER PUBLICATIONS

U.S. Appl. No. 14/948,867, filed Nov. 23, 2015.

*Primary Examiner* — Kent Yip
(74) *Attorney, Agent, or Firm* — Oblon, McClelland, Maier & Neustadt, L.L.P.

(57) ABSTRACT

An image forming apparatus includes: an image processor configured to perform first image processing on image data having a first resolution and to add tag data to a target pixel where second image processing is to be performed; a resolution converter configured to convert the image data into image data having a second resolution higher than the first resolution, and to perform the second image processing based on arrangement of the image data having the first resolution and the tag data; a pulse generator configured to generate an on-off modulation signal and an application-current switching signal in accordance with the image data having undergone the second image processing; and a light source driver configured to drive the light source in accordance with a current setting value output from an application current setter depending on the application-current switching signal and the on-off modulation signal.

10 Claims, 14 Drawing Sheets

(58) Field of Classification Search
USPC ...... 358/401, 501, 3.26, 3.27; 347/135, 143, 347/237, 247
See application file for complete search history.

(56) References Cited

U.S. PATENT DOCUMENTS

| | | | |
|---|---|---|---|
| 8,237,760 B2 | 8/2012 | Nihei et al. | |
| 8,310,516 B2 | 11/2012 | Tanabe et al. | |
| 8,687,036 B2 | 4/2014 | Ishida et al. | |
| 9,035,988 B2 | 5/2015 | Nihei et al. | |
| 9,521,295 B2 * | 12/2016 | Fujita | H04N 1/40056 |
| 2003/0025785 A1 | 2/2003 | Nihei et al. | |
| 2003/0067533 A1 | 4/2003 | Omori et al. | |
| 2003/0156184 A1 | 8/2003 | Suzuki et al. | |
| 2004/0125199 A1 | 7/2004 | Omori et al. | |
| 2005/0030435 A1 | 2/2005 | Uemura | |
| 2005/0243163 A1 | 11/2005 | Ozasa et al. | |
| 2006/0285186 A1 | 12/2006 | Ishida et al. | |
| 2007/0030548 A1 | 2/2007 | Nihei et al. | |
| 2007/0091163 A1 | 4/2007 | Omori et al. | |
| 2007/0132828 A1 | 6/2007 | Ishida et al. | |
| 2007/0242127 A1 | 10/2007 | Omori et al. | |
| 2008/0088893 A1 | 4/2008 | Ishida et al. | |
| 2008/0123160 A1 | 5/2008 | Omori et al. | |
| 2008/0218813 A1 | 9/2008 | Tanabe et al. | |
| 2008/0225106 A1 | 9/2008 | Omori et al. | |
| 2008/0239336 A1 | 10/2008 | Tanabe et al. | |
| 2008/0267663 A1 | 10/2008 | Ichii et al. | |
| 2009/0167837 A1 | 7/2009 | Ishida et al. | |
| 2009/0174915 A1 | 7/2009 | Nihei et al. | |
| 2009/0195635 A1 | 8/2009 | Ishida et al. | |
| 2009/0231656 A1 | 9/2009 | Suzuki et al. | |
| 2009/0303451 A1 | 12/2009 | Miyake et al. | |
| 2010/0119262 A1 | 5/2010 | Omori et al. | |
| 2010/0214637 A1 | 8/2010 | Nihei et al. | |
| 2011/0199657 A1 | 8/2011 | Ishida et al. | |
| 2011/0228037 A1 | 9/2011 | Omori et al. | |
| 2012/0099165 A1 | 4/2012 | Omori et al. | |
| 2012/0189328 A1 | 7/2012 | Suzuki et al. | |
| 2012/0293783 A1 | 11/2012 | Ishida et al. | |
| 2013/0302052 A1 | 11/2013 | Iwata et al. | |
| 2014/0139603 A1 | 5/2014 | Fujita et al. | |
| 2014/0139605 A1 | 5/2014 | Fujita et al. | |
| 2014/0176656 A1 | 6/2014 | Omori et al. | |
| 2014/0268186 A1 | 9/2014 | Iwata et al. | |
| 2014/0327938 A1 | 11/2014 | Ishida et al. | |
| 2014/0333940 A1 | 11/2014 | Iwata et al. | |
| 2014/0333941 A1 | 11/2014 | Iwata et al. | |
| 2015/0125171 A1 | 5/2015 | Iwata et al. | |
| 2015/0156373 A1 | 6/2015 | Fujita et al. | |
| 2015/0180200 A1 | 6/2015 | Fujita et al. | |
| 2015/0251442 A1 | 9/2015 | Ishida et al. | |
| 2015/0324671 A1 | 11/2015 | Iwata et al. | |
| 2015/0350491 A1 | 12/2015 | Iwata et al. | |
| 2016/0012322 A1 | 1/2016 | Iwata et al. | |

FOREIGN PATENT DOCUMENTS

| | | | |
|---|---|---|---|
| JP | 4640257 B2 | 12/2010 | |
| JP | 4968902 B2 | 4/2012 | |

* cited by examiner

IMAGE FORMING APPARATUS AND METHOD FOR DRIVING LIGHT SOURCE

CROSS-REFERENCE TO RELATED APPLICATIONS

The present application claims priority to and incorporates by reference the entire contents of Japanese Patent Application No. 2015-032324 filed in Japan on Feb. 20, 2015, and Japanese Patent Application No. 2016-028148 filed in Japan on Feb. 17, 2015.

BACKGROUND OF THE INVENTION

1. Field of the Invention

The present invention relates generally to an image forming apparatus and a method for driving a light source.

2. Description of the Related Art

Digital printers based on an electrophotographic process have come to be used in the production printing industry in recent years. In the production printing industry, demands for higher image quality and higher reliability of electrophotographic images are increasing. In reproducibility of thin lines and characters, electrophotographic images are required to achieve higher image quality. In particular, enhancing reproducibility of characters of minute sizes corresponding to two or three points and reducing character thickening resulting from an electrophotographic process are desired.

Further, the occurrence of the distortion of the aspect ratio of characters and shapes of minute sizes deriving from the developing process has been found. Therefore, the demands to reduce such distortion of the aspect ratio in the image have increased.

Under these circumstances, some digital printers used in the production printing industry include an image processor configured to perform image processing on input image data, which is high-resolution multibit data of, e.g., 1,200 dpi (dots per inch) or 2,400 dpi, to increase image quality. If data to be handled by the image processor is multibit data of for example, resolution of 2,400 dpi or 4,800 dpi, degree of freedom in image processing is increased. Furthermore, thinning, smoothing, and the like become applicable even to minute characters and lines where a single 1,200-dpi pixel is heavily used.

Some digital printers used in the production printing industry include an optical scanning device, in which an LDA (laser diode array) or a VCSEL (vertical-cavity surface-emitting laser) is employed as a light source that irradiates a surface of a photoconductor drum, thereby implementing a multiple beam system. The optical scanning device configured as such can form an electrostatic latent image at a resolution of 2,400 dpi or 4,800 dpi, which is higher than that of input image data of 1,200 dpi or higher, and therefore can achieve printing quality with high image quality and high speed.

Using such optical scanning devices as those described above configured to perform image processing using high-resolution input image data or to implement a multiple beam system is effective in enhancing reproducibility of minute characters and thin lines of digital printers in the production printing industry.

However, when image processing is performed by the image processor using high-resolution input image data, the amount of data to be transferred to a light-source-modulation-data generator and a light source driver becomes considerably large. This can disadvantageously increase cost caused by adoption of an interface for increasing productivity and data transfer. More specifically, if input image data handled by the image processor is multibit data of, for example, resolution of 2,400 dpi or 4,800 dpi, the amount of data to be transferred downstream to the light-source-modulation-data generator and the light source driver becomes considerably large, which bottlenecks productivity.

Meanwhile, the light-source-modulation-data generator arranged downstream of the image processor to generate data for driving a light source of the optical scanning device is capable of fast processing of data having a higher resolution. However, because image data transferred to the light-source-modulation-data generator has been converted for printing and does not contain image attribute information, it is difficult for the light-source-modulation-data generator to perform all image processing.

Therefore, there is a need for an image forming apparatus and a method for driving a light source capable of increasing image quality of images containing minute characters and line images by performing image processing easily and with high resolution while solving the problem related to data transfer downstream from an image processor.

SUMMARY OF THE INVENTION

It is an object of the present invention to at least partially solve the problems in the conventional technology.

An image forming apparatus includes: an image processor configured to perform first image processing on image data having a first resolution and to add tag data to a target pixel, the target pixel being a pixel where second image processing is to be performed; a resolution converter configured to convert the image data having the first resolution into image data having a second resolution, the second resolution being higher than the first resolution, and to perform the second image processing based on arrangement of the image data having the first resolution and the tag data, both output from the image processor; a pulse generator configured to generate an on-off modulation signal and an application-current switching signal in accordance with the image data having undergone the second image processing; an application current setter configured to output a current setting value for an electric current to be applied to a light source; and a light source driver configured to drive the light source in accordance with the current setting value and the on-off modulation signal, the current setting value being output depending on the application-current switching signal.

A method is for driving a light source in an image forming apparatus. The method includes: performing image processing to perform first image processing on image data having a first resolution and add tag data to a target pixel, the target pixel being a pixel where second image processing is to be performed; performing resolution conversion to convert the image data having the first resolution into image data having a second resolution, the second resolution being higher than the first resolution, and perform the second image processing based on arrangement of the image data having the first resolution and the tag data; performing pulse generation to generate an on-off modulation signal and an application-current switching signal in accordance with the image data having undergone the second image processing; setting an application current by outputting a current setting value for an electric current to be applied to the light source; and driving the light source in accordance with the current setting value and the on-off modulation signal, the current setting value being output depending on the application-current switching signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings.

First Embodiment

Figure 1:
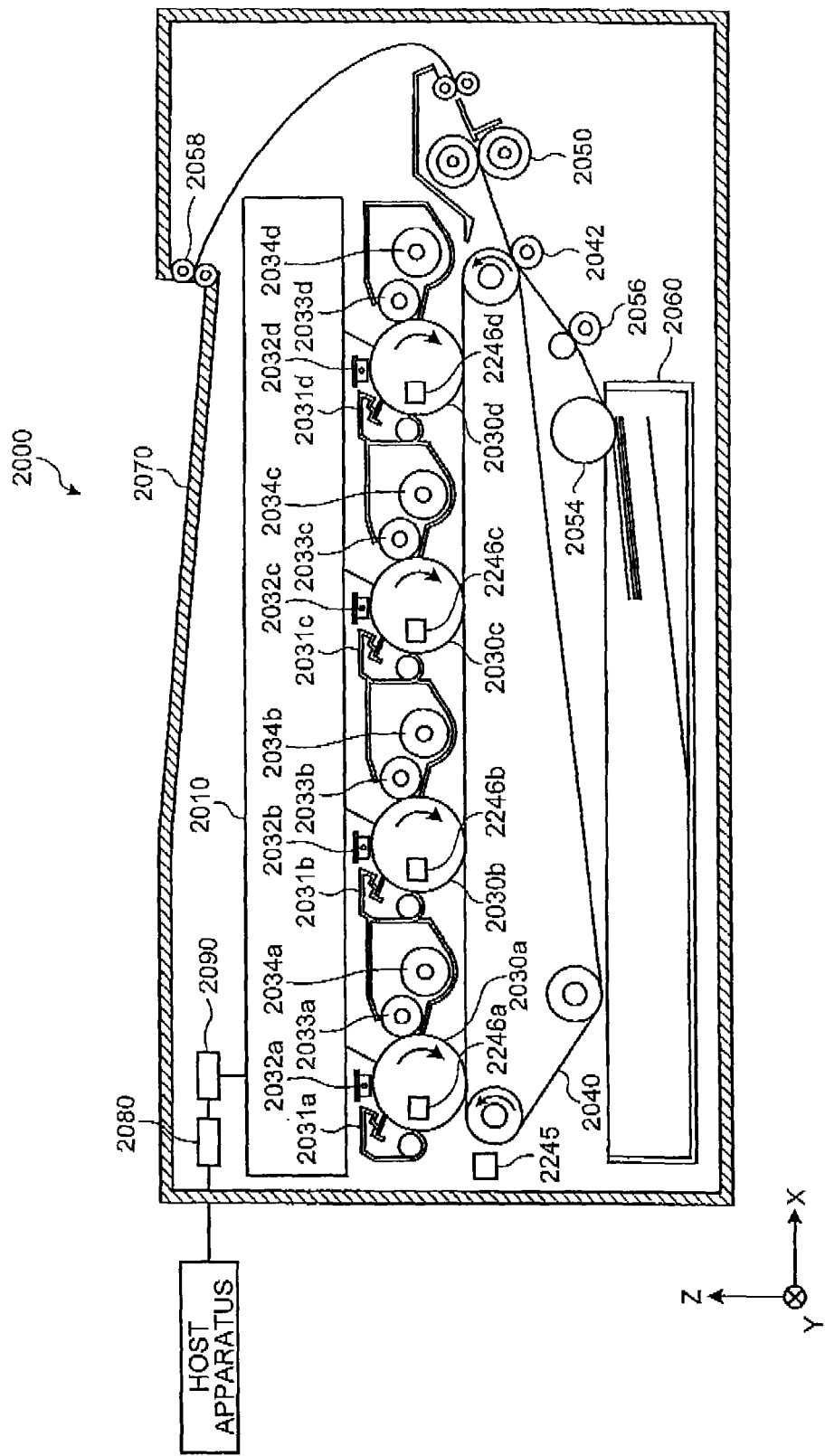
FIG. 1 is a longitudinal cross-sectional side view illustrating a schematic configuration of a color printer according to a first embodiment.

FIG. 1 is a longitudinal cross-sectional side view illustrating a schematic configuration of a color printer 2000 according to a first embodiment. As illustrated in FIG. 1, the color printer 2000, which is an example of "image forming apparatus", is a multiple-color printer of a tandem system configured to form a full-color image by superimposing four colors (black, cyan, magenta, and yellow) on one another.

The color printer 2000 includes four photoconductor drums (2030a, 2030b, 2030c, and 2030d), a surface of each of which is a to-be-scanned surface having photosensitivity. The four photoconductor drums (2030a, 2030b, 2030c, and 2030d) correspond to the four respective colors (black, cyan, magenta, and yellow).

The color printer 2000 includes four cleaning units (2031a, 2031b, 2031c, and 2031d), four charging devices (2032a, 2032b, 2032c, and 2032d), four developing rollers (2033a, 2033b, 2033c, and 2033d), and four toner cartridges (2034a, 2034b, 2034c, and 2034d) associated with the respective four photoconductor drums (2030a, 2030b, 2030c, and 2030d).

The color printer 2000 further includes a transfer belt 2040, a transfer roller 2042, and a fixing roller 2050.

The toner cartridge 2034a contains black toner, which is to be supplied to the developing roller 2033a. The toner cartridge 2034b contains cyan toner, which is to be supplied to the developing roller 2033b. The toner cartridge 2034c contains magenta toner, which is to be supplied to the developing roller 2033c. The toner cartridge 2034d contains yellow toner, which is to be supplied to the developing roller 2033d.

Each of the charging devices 2032a, 2032b, 2032c, and 2032d uniformly charges a surface of a corresponding one of the photoconductor drums 2030a, 2030b, 2030c, and 2030d in advance of an electrophotographic process.

The photoconductor drum 2030a, the charging device 2032a, the developing roller 2033a, the toner cartridge 2034a, and the cleaning unit 2031a are used as a set, forming an image forming station (hereinafter, sometimes referred to as "K station" for convenience) for forming black images.

The photoconductor drum 2030b, the charging device 2032b, the developing roller 2033b, the toner cartridge 2034b, and the cleaning unit 2031b are used as a set, forming an image forming station (hereinafter, sometimes referred to as "C station" for convenience) for forming cyan images.

The photoconductor drum 2030c, the charging device 2032c, the developing roller 2033c, the toner cartridge 2034c, and the cleaning unit 2031c are used as a set, forming an image forming station (hereinafter, sometimes referred to as "M station" for convenience) for forming magenta images.

The photoconductor drum 2030d, the charging device 2032d, the developing roller 2033d, the toner cartridge 2034d, and the cleaning unit 2031d are used as a set, forming an image forming station (hereinafter, sometimes referred to as "Y station" for convenience) for forming yellow images.

A photosensitive layer is formed on the surface of each of the photoconductor drums 2030a, 2030b, 2030c, and 2030d. Accordingly, the surface of each of the photoconductor drums 2030a, 2030b, 2030c, and 2030d is the to-be-scanned surface. It is assumed that each of the photoconductor drums 2030a, 2030b, 2030c, and 2030d is rotated by a rotating mechanism (not shown) in the direction indicated by an arrow in the paper plane of FIG. 1.

In the following description, it is assumed that, in an X-Y-Z Cartesian coordinate system, the longitudinal direction of each of the photoconductor drums 2030a, 2030b, 2030c, and 2030d is the Y-axis direction; the direction, along which the four photoconductor drums (2030a, 2030b, 2030c, and 2030d) are arranged, is the X-axis direction.

The color printer 2000 includes an optical scanning device 2010 for forming electrostatic latent images on the four photoconductor drums (2030a, 2030b, 2030c, and 2030d). Briefly, the optical scanning device 2010 includes a light source for emitting laser light, a polygon mirror for deflecting the laser light emitted from the light source, and a scanning optical system for guiding the laser light deflected by the polygon mirror to the four photoconductor drums (2030a, 2030b, 2030c, and 2030d). A configuration of the optical scanning device 2010 is described in detail later.

The optical scanning device 2010 irradiates the charged surfaces of the four photoconductor drums (2030a, 2030b, 2030c, and 2030d) with corresponding respective light beams modulated on a color-by-color basis based on multiple-color image information (i.e., black image information, cyan image information, magenta image information, and yellow image information) fed from a host apparatus (e.g., a personal computer) via a communication control device 2080, which is described later, a network, and/or the like. As a result, charge vanishes only at portions irradiated with light on the surfaces of the photoconductor drums 2030a, 2030b, 2030c, and 2030d, thereby forming respective latent images thereon in accordance with the image information.

An area where image information is written on each of the photoconductor drums 2030a, 2030b, 2030c, and 2030d may be generally referred to as "effective scanning area", "image forming area", "effective image area" or the like.

The latent image formed on the surface of the photoconductor drum (2030a, 2030b, 2030c, 2030d) moves toward the corresponding developing roller (2033a, 2033b, 2033c, 2033d) with rotation of the photoconductor drum (2030a, 2030b, 2030c, 2030d).

The toner, which is in a corresponding one of the toner cartridges 2034a, 2034b, 2034c, and 2034d, is thinly and uniformly applied to a surface of each of the developing rollers 2033a, 2033b, 2033c, and 2033d. When the toner on the surface of the developing roller (2033a, 2033b, 2033c, 2033d) comes into contact with the surface of the corresponding photoconductor drum (2030a, 2030b, 2030c, 2030d), the toner transfers only to the latent image portion on the surface of the photoconductor drum. In other words, the developing rollers 2033a, 2033b, 2033c, and 2033d develop the latent images formed on the surfaces of the photoconductor drums 2030a, 2030b, 2030c, and 2030d into visible images by causing toner to stick to the latent images.

The images (toner images) where toner is sticking move toward the transfer belt 2040 with rotations of the photoconductor drums 2030a, 2030b, 2030c, and 2030d. The toner images of yellow, magenta, cyan, and black are sequentially transferred onto the transfer belt 2040 at predetermined timing to be superimposed on one another, thereby forming a color image.

The color printer 2000 further includes a paper feeding roller 2054, a pair of registration rollers 2056, a paper ejection roller 2058, a paper feeding tray 2060, and a paper ejection tray 2070.

The paper feeding tray 2060 houses recording paper. The paper feeding roller 2054 arranged near the paper feeding tray 2060 picks up the recording paper one sheet by one sheet from the paper feeding tray 2060 and conveys the recording paper to the pair of registration rollers 2056. The pair of registration roller 2056 delivers the recording paper to a space between the transfer belt 2040 and the transfer roller 2042 at given timing.

The color image formed by sequentially transferring the toner images onto the transfer belt 2040 in the superimposing manner is transferred onto the recording paper delivered to the space between the transfer belt 2040 and the transfer roller 2042. The recording paper, onto which the image is transferred, is delivered to the fixing roller 2050.

The fixing roller 2050 applies heat and a pressure to the recording paper to thereby fix the toner onto the recording paper. The recording paper having undergone the fixing is delivered by the paper ejection roller 2058 to the paper ejection tray 2070 to be stacked one sheet by one sheet in a pile on the paper ejection tray 2070.

Each of the cleaning units 2031a, 2031b, 2031c, and 2031d removes toner (residual toner) left on the surface of a corresponding one of the photoconductor drums 2030a, 2030b, 2030c, and 2030d. The surface of the photoconductor drum (2030a, 2030b, 2030c, 2030d), from which the residual toner is removed, returns to a position where the surface faces the corresponding charging device (2032a, 2032b, 2032c, 2032d) and is uniformly charged.

The color printer 2000 further includes the communication control device 2080, a density detector 2245, four home position sensors (2246a, 2246b, 2246c, and 2246d), and a printer control device 2090, which performs overall control of the above-described elements.

The communication control device 2080 controls bidirectional communication with a host apparatus via a network or the like. The printer control device 2090 includes a CPU (central processing unit), a ROM (read only memory), a RAM (random access memory), and an A/D (analog-to-digital) conversion circuit. The ROM stores therein programs written in code decodable by the CPU and various data for use in execution of the programs. The RAM is a working memory. The A/D conversion circuit converts analog data into digital data. The printer control device 2090 controls the elements in accordance with a request from the host apparatus and transmits image information fed from the host apparatus to the optical scanning device 2010.

Figure 2:
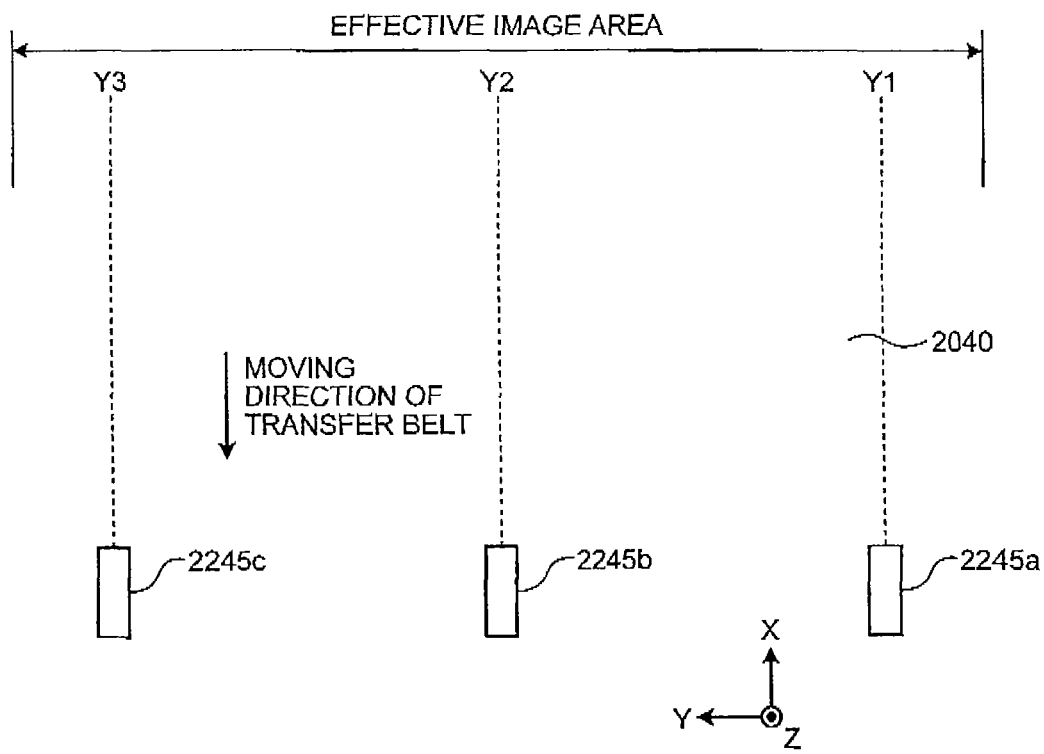
FIG. 2 is a plan view illustrating positional relationship between a density detector and a transfer belt.

The density detector 2245 is arranged in the negative X direction from the transfer belt 2040. FIG. 2 is a plan view illustrating positional relationship between the density detector 2245 and the transfer belt 2040. As illustrated in FIG. 2, the density detector 2245 includes three optical sensors (2245a, 2245b, and 2245c).

The optical sensor 2245a is arranged at a position facing near an end, in the negative Y direction, of the effective image area on the transfer belt 2040. The optical sensor 2245c is arranged at a position facing near an end, in the positive Y direction, of the effective image area on the transfer belt 2040. The optical sensor 2245b is arranged at a substantially midpoint between the optical sensor 2245a and the optical sensor 2245c in the main-scanning direction. Here, center, in the main-scanning direction (Y-axis direction), of the optical sensor 2254a is referred to as Y1, center of the optical sensor 2245b is referred to as Y2, and center of the optical sensor 2245c is referred to as Y3.

Figure 3:
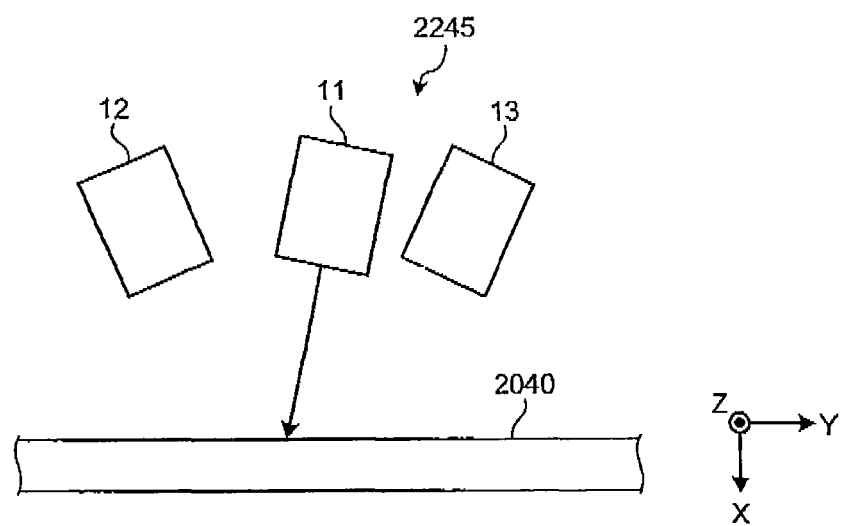
FIG. 3 is a diagram exemplifying a configuration of an optical sensor.

FIG. 3 is a diagram exemplifying a configuration of each of the optical sensors 2245a, 2245b, and 2245c. As illustrated in FIG. 3, each of the optical sensors 2245a, 2245b, and 2245c includes an LED (light emitting diode) 11, which emits light (hereinafter, sometimes referred to as "detection light") toward the transfer belt 2040, a specularly-reflected-light receiving element 12, which receives specularly-reflected light from the transfer belt 2040 or a toner patch on the transfer belt 2040, and a diffusely-reflected-light receiving element 13, which receives diffusely-reflected light from the transfer belt 2040 or the toner patch on the transfer belt 2040. Each of the light receiving elements 12 and 13 outputs a signal (photoelectric conversion signal) depending on intensity of received light.

The home position sensor 2246a detects a rotational home position of the photoconductor drum 2030a. The home position sensor 2246b detects a rotational home position of the photoconductor drum 2030b. The home position sensor 2246c detects a rotational home position of the photoconductor drum 2030c. The home position sensor 2246d detects a rotational home position of the photoconductor drum 2030d.

The configuration of the optical scanning device 2010 is described below.

Figure 4:
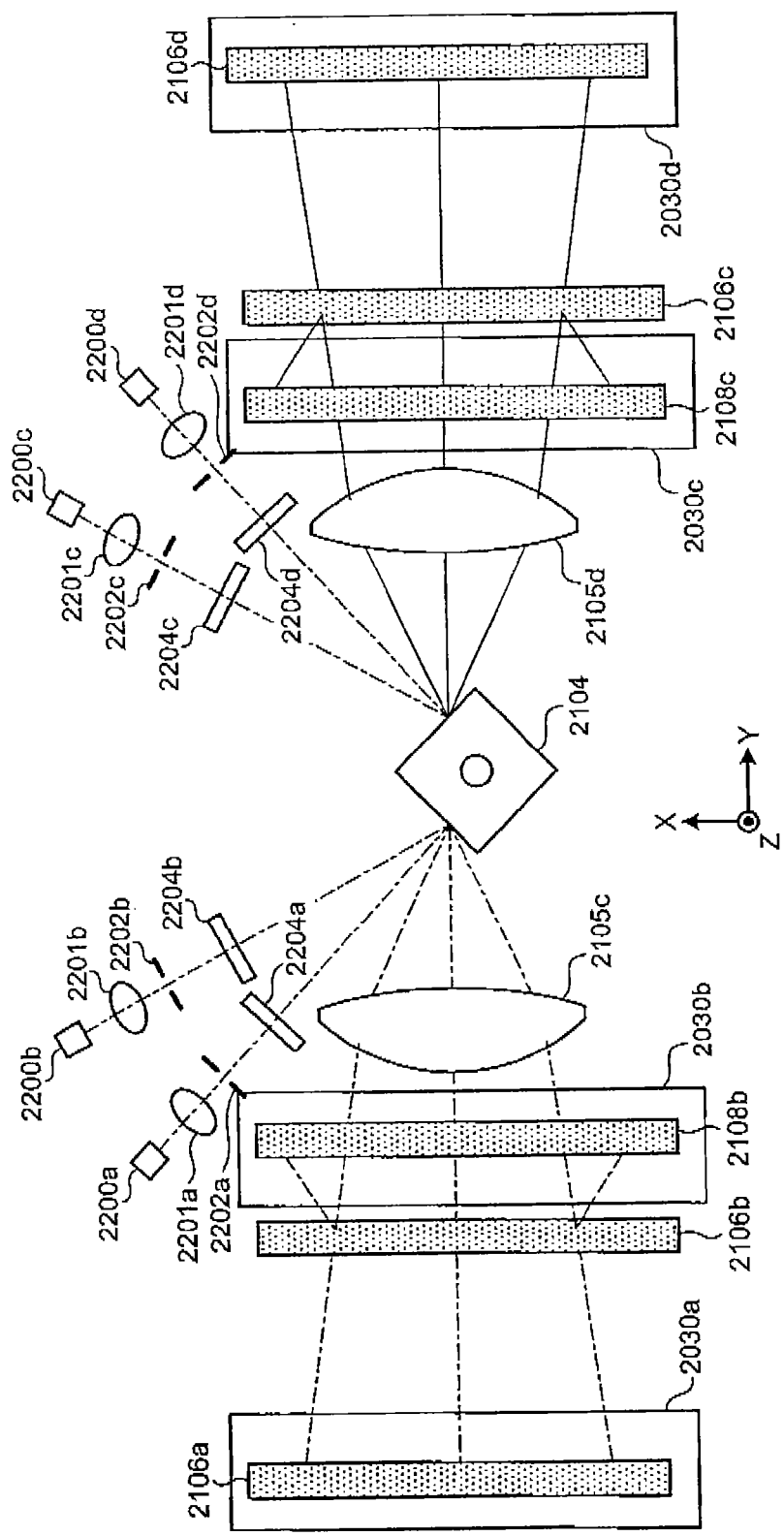
FIG. 4 is a plan view schematically illustrating a configuration of an optical scanning device.
Figure 5:
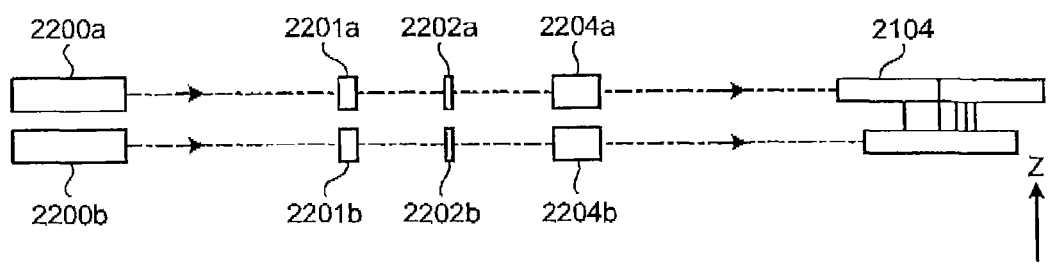
FIG. 5 is a side view illustrating a configuration of a part of a laser emission system of the optical scanning device.
Figure 6:
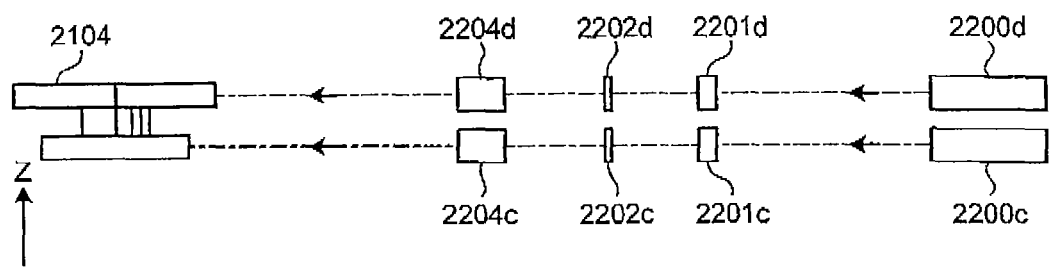
FIG. 6 is a side view illustrating a configuration of another part of the laser emission system of the optical scanning device.
Figure 7:
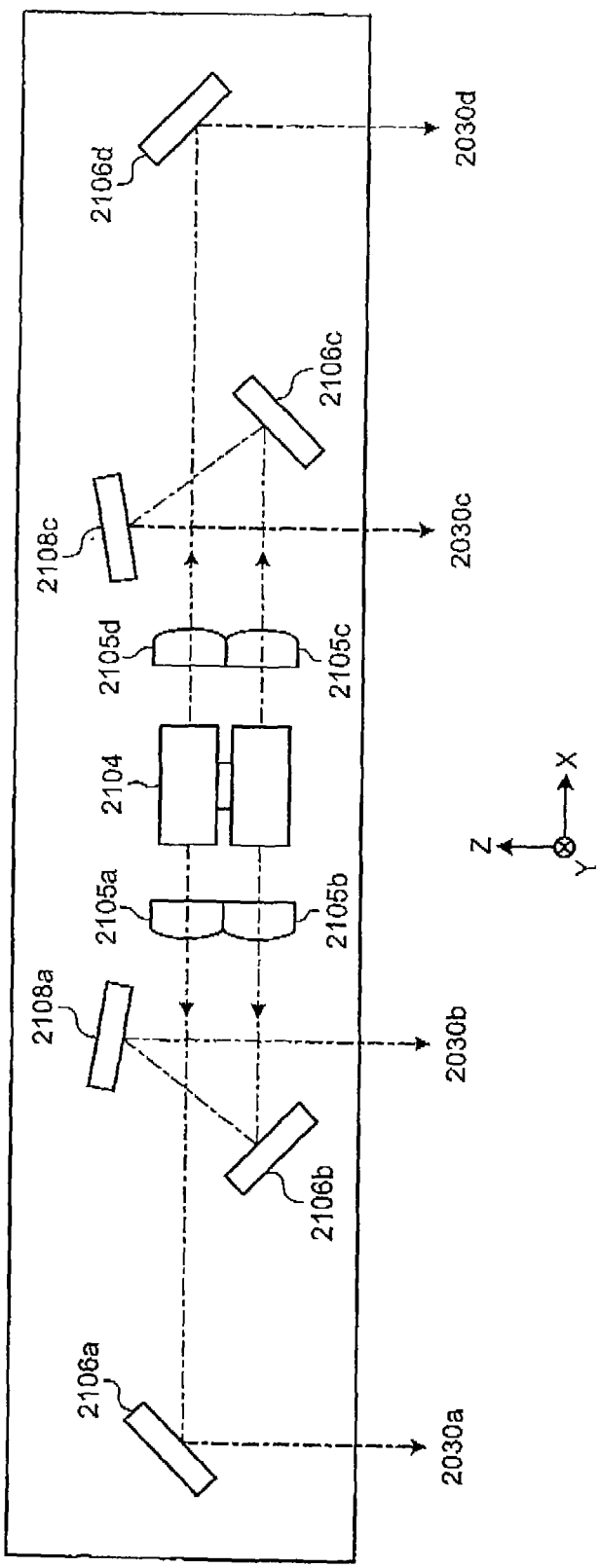
FIG. 7 is a side view illustrating a configuration of a part of a scanning optical system of the optical scanning device.

FIG. 4 is a plan view schematically illustrating the configuration of the optical scanning device 2010. FIG. 5 is a side view illustrating a configuration of a part of a laser emission system of the optical scanning device 2010. FIG. 6 is a side view illustrating a configuration of another part of the laser emission system of the optical scanning device 2010. FIG. 7 is a side view illustrating a configuration of a part of the scanning optical system of the optical scanning device 2010.

The optical scanning device 2010 includes, as illustrated in, for example, FIGS. 4 to 7, four light sources (2200a, 2200b, 2200c, and 2200d), four coupling lenses (2201a, 2201b, 2201c, and 2201d), four aperture plates (2202a, 2202b, 2202c, and 2202d), four cylindrical lenses (2204a, 2204b, 2204c, and 2204d), a polygon mirror 2104, four scanning lenses (2105a, 2105b, 2105c, and 2105d), and six reflecting mirrors (2106a, 2106b, 2106c, 2106d, 2108b, and 2108c), which are associated with the four photoconductor drums (2030a, 2030b, 2030c, and 2030d).

Each of the light sources 2200a, 2200b, 2200c, 2200d includes a VCSEL (vertical-cavity surface-emitting laser) array, in which a plurality of light emitters are arranged in a two-dimensional array, thereby implementing a multiple beam system. The plurality of light emitters of the VCSEL are arranged such that, when all the light emitters are orthogonally projected onto an imaginary line extending in the sub-scanning direction, the intervals between the light emitters are equal on the projection. The "interval between the light emitters" is a center-to-center distance between adjacent two light emitters.

The coupling lens 2201a is arranged on an optical path of a light beam emitted from the light source 2200a to convert the light beam into a substantially parallel light beam. The coupling lens 2201b is arranged on an optical path of a light beam emitted from the light source 2200b to convert the light beam into a substantially parallel beam. The coupling lens 2201c is arranged on an optical path of a light beam emitted from the light source 2200c to convert the light beam into a substantially parallel beam. The coupling lens 2201d is arranged on an optical path of a light beam emitted from the light source 2200d to convert the light beam into a substantially parallel beam.

The aperture plate 2202a has an aperture to shape the light beam exiting the coupling lens 2201a. The aperture plate 2202b has an aperture to shape the light beam exiting the coupling lens 2201b. The aperture plate 2202c has an aperture to shape the light beam exiting the coupling lens 2201c. The aperture plate 2202d has an aperture to shape the light beam exiting the coupling lens 2201d.

The cylindrical lens 2204a causes the light beam passed through the aperture of the aperture plate 2202a to converge, in the Z-axis direction, near a deflecting reflection surface of the polygon mirror 2104. The cylindrical lens 2204b causes the light beam passed through the aperture of the aperture plate 2202b to converge, in the Z-axis direction, near a deflecting reflection surface of the polygon mirror 2104. The cylindrical lens 2204c causes the light beam passed through the aperture of the aperture plate 2202c to converge, in the Z-axis direction, near a deflecting reflection surface of the polygon mirror 2104. The cylindrical lens 2204d causes the light beam passed through the aperture of the aperture plate 2202d to converge, in the Z-axis direction, near a deflecting reflection surface of the polygon mirror 2104.

An optical system made up of the coupling lens 2201a, the aperture plate 2202a, and the cylindrical lens 2204a is a pre-deflector optical system for the K station. An optical system made up of the coupling lens 2201b, the aperture plate 2202b, and the cylindrical lens 2204b is a pre-deflector optical system for the C station. An optical system made up of the coupling lens 2201c, the aperture plate 2202c, and the cylindrical lens 2204c is a pre-deflector optical system for the M station. An optical system made up of the coupling lens 2201d, the aperture plate 2202d, and the cylindrical lens 2204d is a pre-deflector optical system for the Y station.

The polygon mirror 2104 includes quadruple mirrors of two-stage structure and rotating about an axis parallel to the Z-axis, and each mirror serves as the deflecting reflection surface. The quadruple mirror on the first (bottom) stage is arranged to deflect each of the light beam exiting the cylindrical lens 2204b and the light beam exiting the cylindrical lens 2204c. The quadruple mirror on the second (top) stage is arranged to deflect each of the light beam exiting the cylindrical lens 2204a and the light beam exiting the cylindrical lens 2204d.

Each of the light beams exiting the cylindrical lens 2204a and the cylindrical lens 2204b is deflected in the negative X direction from the polygon mirror 2104A. Each of the light beams exiting the cylindrical lens 2204c and the cylindrical lens 2204d is deflected in the positive X direction from the polygon mirror 2104.

Each of the scanning lenses 2105a, 2105b, 2105c, 2105d has an optical power that converges a light beam near the corresponding photoconductor drum (2030a, 2030b, 2030c, 2030d) and an optical power that causes a light spot on the surface of the corresponding photoconductor drum (2030a, 2030b, 2030c, 2030d) to move in the main-scanning direction at a constant velocity with rotation of the polygon mirror 2104.

The scanning lens 2105a and the scanning lens 2105b are arranged in the negative X direction from the polygon mirror 2104. The scanning lens 2105c and the scanning lens 2105d are arranged in the positive X direction from the polygon mirror 2104. The scanning lens 2105a and the scanning lens 2105b are stacked on top of each other in the Z-axis direction such that the scanning lens 2105b faces the quadruple mirror on the first stage, while the scanning lens 2105a faces the quadruple mirror on the second stage. The scanning lens 2105c and the scanning lens 2105d are stacked on top of each other in the Z-axis direction such that the scanning lens 2105c faces the quadruple mirror on the first stage, while the scanning lens 2105d faces the quadruple mirror on the second stage.

The light beam passed through the cylindrical lens 2204a and deflected by the polygon mirror 2104 irradiates, via the scanning lens 2105a and the reflecting mirror 2106a, the photoconductor drum 2030a to form a light spot thereon. The light spot moves in the longitudinal direction of the photoconductor drum 2030a with rotation of the polygon mirror 2104. In short, the light spot scans the surface of the photoconductor drum 2030a. The direction, in which the light spot moves, is the "main-scanning direction" of the photoconductor drum 2030a; the rotating direction of the photoconductor drum 2030a is the "sub-scanning direction" of the photoconductor drum 2030a.

The light beam passed through the cylindrical lens 2204b and deflected by the polygon mirror 2104 irradiates, via the scanning lens 2105b, the reflecting mirror 2106b, and the reflecting mirror 2108b, the photoconductor drum 2030b to form a light spot thereon. The light spot moves in the longitudinal direction of the photoconductor drum 2030b with rotation of the polygon mirror 2104. In short, the light spot scans the surface of the photoconductor drum 2030b. The direction, in which the light spot moves, is the "main-scanning direction" of the photoconductor drum 2030b; the rotating direction of the photoconductor drum 2030b is the "sub-scanning direction" of the photoconductor drum 2030b.

The light beam passed through the cylindrical lens 2204c and deflected by the polygon mirror 2104 irradiates, via the scanning lens 2105c, the reflecting mirror 2106c, and the reflecting mirror 2108c, the photoconductor drum 2030c to form a light spot thereon. The light spot moves in the longitudinal direction of the photoconductor drum 2030c with rotation of the polygon mirror 2104. In short, the light spot scans the surface of the photoconductor drum 2030c. The direction, in which the light spot moves, is the "main-scanning direction" of the photoconductor drum 2030c; the rotating direction of the photoconductor drum 2030c is the "sub-scanning direction" of the photoconductor drum 2030c.

The light beam passed through the cylindrical lens 2204d and deflected by the polygon mirror 2104 irradiates, via the scanning lens 2105d and the reflecting mirror 2106d, the photoconductor drum 2030d to form a light spot thereon. The light spot moves in the longitudinal direction of the photoconductor drum 2030d with rotation of the polygon mirror 2104. In short, the light spot scans the surface of the photoconductor drum 2030d. The direction, in which the light spot moves, is the "main-scanning direction" of the photoconductor drum 2030d; the rotating direction of the photoconductor drum 2030d is the "sub-scanning direction" of the photoconductor drum 2030d.

The reflecting mirrors 2106a, 2106b, 2106c, 2106d, 2108b, and 2108c are arranged so as to equalize, among the photoconductor drums 2030a, 2030b, 2030c, and 2030d, the optical path length from the polygon mirror 2104 to the photoconductor drum and so that the photoconductor drums 2030a, 2030b, 2030c, and 2030d have a same light-beam incidence position and a same incidence angle.

The optical system arranged on the optical path between the polygon mirror 2104 and each of the photoconductor drums 2030a, 2030b, 2030c, and 2030d is also referred to as the scanning optical system. In this example, the scanning optical system for the K station is made up of the scanning lens 2105a and the reflecting mirror 2106a. The scanning optical system for the C station is made up of the scanning lens 2105b and the two reflecting mirrors (2106b and 2108b). The scanning optical system for the M station is made up of the scanning lens 2105c and the two reflecting mirrors (2106c and 2108c). The scanning optical system for the Y station is made up of the scanning lens 2105d and the reflecting mirror 2106d. The scanning lens in each of the scanning optical systems may include a plurality of lenses.

A control system controlling the optical scanning device 2010 is described below.

Figure 8:
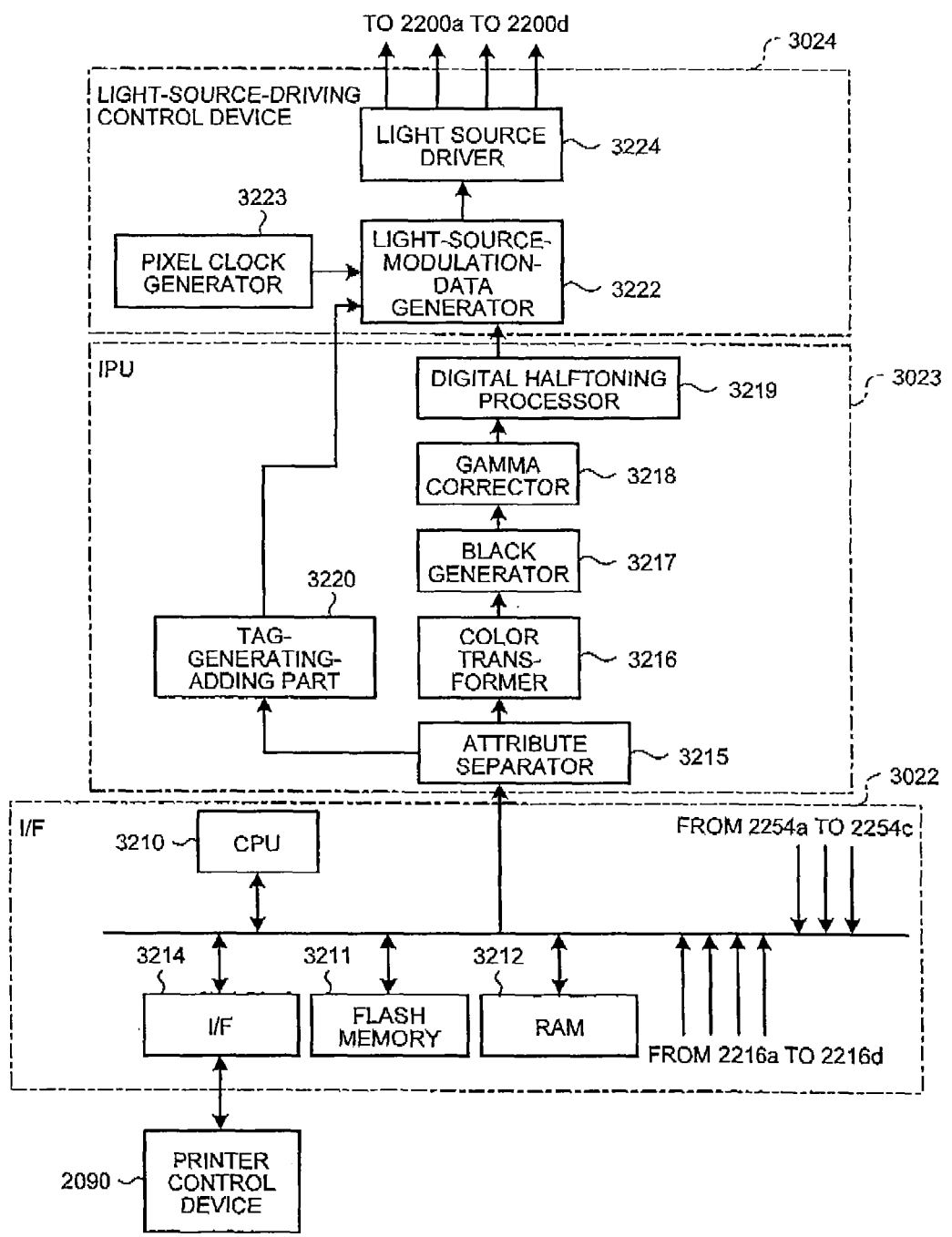
FIG. 8 is a block diagram exemplifying a control system controlling the optical scanning device.

FIG. 8 is a block diagram exemplifying the control system controlling the optical scanning device 2010. As illustrated in FIG. 8, the optical scanning device 2010 includes an I/F (interface) unit 3022, an IPU (image processing unit) 3023, and a light-source-driving control device 3024. These elements are assembled to predetermined positions in an optical housing (not shown). The image processing unit 3023 functions as an image processor that performs various image processing (first image processing) on input image data, which is high-resolution multibit data of 2,400 dpi, for example.

The I/F unit 3022 includes a CPU 3210, a flash memory 3211, a RAM 3212, and an I/F 3214 as exemplified in FIG. 8. The arrows in FIG. 8 indicate flows of representative signals and information but do not indicate every connection relationship between blocks.

The I/F 3214 is a communication interface that controls bidirectional communication with the printer control device 2090. Image data from a host apparatus is supplied via the I/F 3214.

The flash memory 3211 stores therein various programs written in code decodable by the CPU 3210 and various data necessary for execution of the programs. The RAM 3212 is a working memory.

The CPU 3210 operates in accordance with the programs stored in the flash memory 3211 and performs overall control of the optical scanning device 2010.

The image processing unit 3023 includes an attribute separator 3215, a color transformer 3216, a black generator 3217, a gamma corrector 3218, a digital halftoning processor 3219, and a tag-generating-adding part 3220.

The attribute separator 3215 separates image data on an attribute-by-attribute basis so that appropriate processing, which is set for each of attributes such as "text" for pixels belonging to a character, "line" for pixels belonging to a line image, and "image" for bitmap data, can be performed.

The color transformer 3216 transforms RGB image data into CMY, which are colors for reproduction on the printer. The black generator 3217 extracts a black component from the image data transformed to CMY and determines C, M, and Y components of the remaining, thereby eventually converting the image data to CMYK data.

The gamma corrector 3218 performs gradation correction on each of C, M, Y, and K depending on printer's output characteristics. The digital halftoning processor 3219 changes the number of pixels and pixel values in a certain region so as to simulate a continuous gradation with a dot pattern or a line pattern by using a binary or multilevel dither matrix for each of C, M, Y, and K.

The tag-generating-adding part 3220 sets a region, on which processing is to be performed by a light-source-modulation-data generator 3222, which is described later, using the above-described attribute information ("text", "image", "line", or the like) of the image data and adds tag data (different from the foregoing attribute information) to pixels in the target region.

The light-source-driving control device 3024 includes the light-source-modulation-data generator 3222, a pixel clock generator 3223, and a light source driver 3224.

The pixel clock generator 3223 generates a pixel clock signal.

The light-source-modulation-data generator 3222 generates data for driving the light sources 2200a, 2200b, 2200c, and 2200d of the optical scanning device 2010. More specifically, the light-source-modulation-data generator 3222 divides transferred data with a resolution N in the main-scanning direction and in the sub-scanning direction, thereby increasing the resolution to M. The light-source-modulation-data generator 3222 also determines, for each of the image forming stations, timing to start writing based on an output signal of a synchronization detection sensor (not shown).

In accordance with the timing to start the writing, the light-source-modulation-data generator 3222 generates modulation data, which is independent for each of the light emitters, by superimposing dot data for each of the light emitters of each of the light sources 2200*a*, 2200*b*, 2200*c*, and 2200*d* on the pixel clock signal output from the pixel clock generator 3223 and based on information fed from the image processing unit 3023 and/or the like. More specifically, the light-source-modulation-data generator 3222 performs thinning in which edge portions of a thin line is trimmed at a high resolution in accordance the tag data, which is described later. Further, the light-source-modulation-data generator 3222 performs processing of generating power modulation information for changing exposure intensity in a high light intensity pixel area to be exposed with light intensity higher than the normal, at new edges after thinning.

The light source driver 3224 outputs, to each of the light sources 2200*a*, 2200*b*, 2200*c*, and 2200*d*, drive signals for driving the light emitters in accordance with the modulation data fed from the light-source-modulation-data generator 3222.

The light-source-modulation-data generator 3222 is described in detail below.

Figure 9:
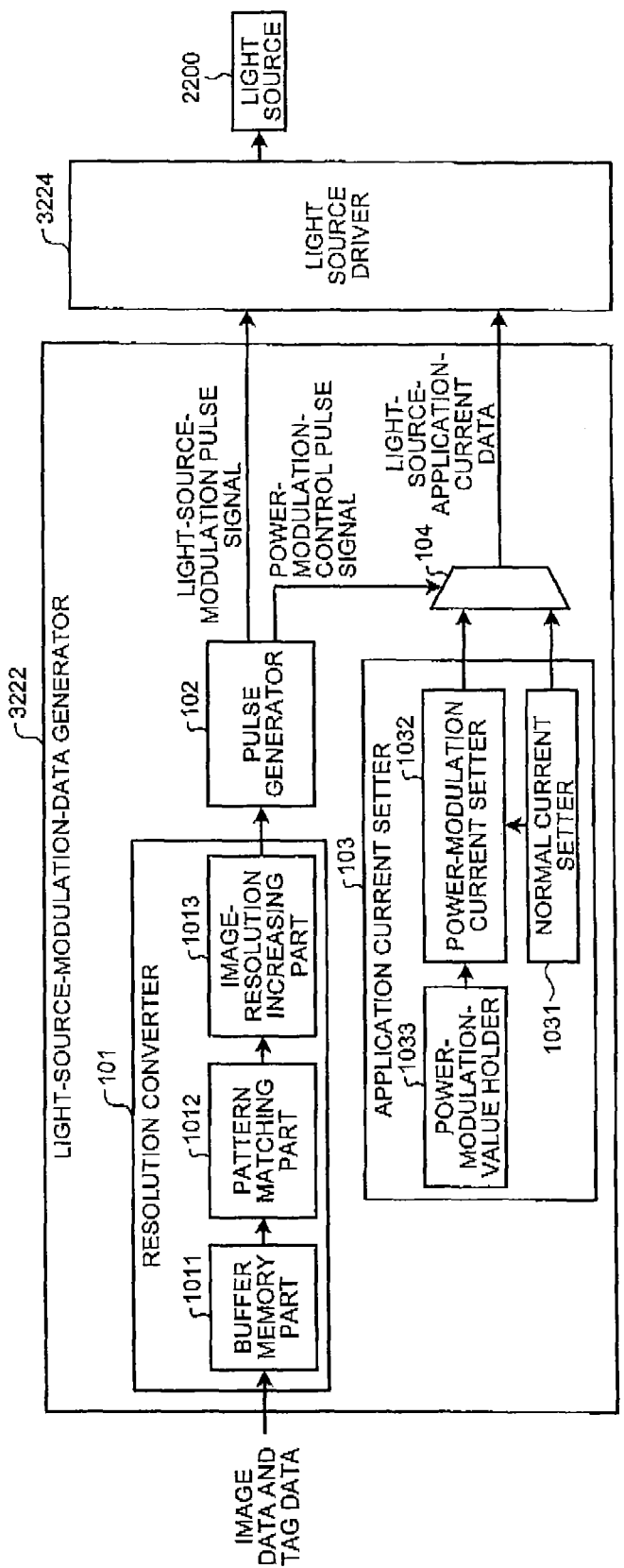
FIG. 9 is a block diagram schematically illustrating a configuration of a light-source-modulation-data generator.

FIG. 9 is a block diagram schematically illustrating a configuration of the light-source-modulation-data generator 3222. As illustrated in FIG. 9, the light-source-modulation-data generator 3222 includes a resolution converter 101, a pulse generator 102, and an application current setter 103. The light-source-modulation-data generator 3222 (the resolution converter 101, the pulse generator 102, and the application current setter 103) and the light source driver 3224 are integrated in a single integrated device to serve as the light-source-driving control device 3024.

The resolution converter 101 sequentially selects a target pixel from image data (image data having a first resolution) based on arrangement of image data (the image data having the first resolution) and tag data, both output from the image processing unit 3023. If the sequentially-selected target pixel is a pixel belonging to an edge (end, contour) in an image such as a thin line, the resolution converter 101 converts the image data having the first resolution into image data having a higher resolution (image data having a second resolution) and performs thinning (second image processing). In the thinning process, the resolution converter 101 performs thinning by trimming pixels constituting edges in the image at the second resolution. The pulse generator 102 generates a light-source-modulation pulse signal, which is an on-off modulation signal, and a power-modulation-control pulse signal, which is an application-current switching signal, in accordance with image data. The application current setter 103 sets, for each of the light sources 2200*a*, 2200*b*, 2200*c*, and 2200*d*, an amount of current to be supplied thereto.

The resolution converter 101 is described in detail below.

The resolution converter 101 includes a buffer memory part 1011, a pattern matching part 1012, and an image-resolution increasing part 1013. The buffer memory part 1011 acquires an image matrix, which is image data and tag data of a region containing a target pixel and pixels around the target pixel. The pattern matching part 1012 determines whether or not the target pixel is a pixel belonging to an edge (end, contour) in an image such as a thin line based on arrangement of the image data (the image data having the first resolution) and the tag data in the image matrix. The image-resolution increasing part 1013 performs conversion to high-resolution image data (image data having the second resolution) of a pattern, which is determined depending on an output of the pattern matching part 1012.

The buffer memory part 1011 receives 2,400 dpi, 1-bit data fed from the image processing unit 3023 and stores a plurality of main-scanning lines of the data. The buffer memory part 1011 passes the stored data downstream in response to data reading performed by a downstream data processor (in this example, the pattern matching part 1012). At this stage, the image data is in the form of a 2,400 dpi, 1-bit signal. The output of the buffer memory part 1011 is fed to the pattern matching part 1012.

The pattern matching part 1012 detects a target pixel, on which image processing is to be performed, in the signal representing the 2,400 dpi, 1-bit image dots by pattern detection using an image matrix, which is described later. If tag data indicating attribute of the image data is given, the pattern matching part 1012 performs the detection by performing pattern matching on a necessary image area, which is indicated by the image attribute. Examples of the image attribute include "text", "picture", and "shape". Thereafter, the pattern matching part 1012 outputs a signal representing pattern information to the image-resolution increasing part 1013.

The image-resolution increasing part 1013 increases the resolution (to 4,800 dpi, for example) of the pixel detected by the pattern matching part 1012, thereby dividing the pixel into a 2×2 block. The image-resolution increasing part 1013 generates image information having undergone thinning by setting image dots of each of the image blocks, into which the pixel is divided, based on the matching pattern information. More specifically, the image-resolution increasing part 1013 performs thinning process in which thinning is performed by trimming pixels constituting edges in the image at the second resolution (4800 dpi, for example). The image-resolution increasing part 1013 also generates power modulation information for changing exposure intensity in a high light intensity pixel area to be exposed with light intensity higher than the normal, at new edges after thinning. The image-resolution increasing part 1013 outputs the image information and the power modulation information to the pulse generator 102.

The pulse generator 102 converts the image information and the power modulation information into serial signals based on a high-frequency clock (basic clock, from which pulse signals are generated) and outputs the converted signals as a light-source-modulation pulse signal (on-off modulation signal) and a power-modulation control signal (application-current switching signal), respectively. The pulse signals are serial signals, and the high (H) period and low (L) period of the pulse signals indicate On-off timing and switching timing. The pulse generator 102 outputs the light-source-modulation pulse signal to the light source driver 3224. The pulse generator 102 outputs the power-modulation control signal to a current data selector 104. The power-modulation control signal serves as a switching signal for selecting, by the current data selector 104, either the normal-light-intensity data or high-light-intensity data, which are described later. In this example, the H period of the pulse signal corresponds to a high-light-intensity period, while the L period of the pulse signal corresponds to a normal-light-intensity period.

The application current setter 103 is described in detail below.

The application current setter 103 includes a normal current setter 1031, a power-modulation current setter 1032, and a power-modulation-value holder 1033. The application current setter 103 outputs a plurality of current setting values, which are to be switched depending on the power-modulation control signal (application-current switching signal) generated by the pulse generator 102, for an electric current to be supplied to the light source (2200a, 2200b, 2200c, 2200d). More specifically, the application current setter 103 performs thinning, which is a process of trimming edge portions of a thin line at a high resolution, and application current modulation (power modulation), which is a process of changing exposure intensity of the thin line.

The normal current setter 1031 generates normal-light-intensity data. The power-modulation current setter 1032 generates high-light-intensity data by magnifying the normal-light-intensity data generated by the normal current setter 1031. The power-modulation-value holder 1033 holds a magnification ratio in the power-modulation current setter 1032. The normal-light-intensity data generated by the normal current setter 1031 and the high-light-intensity data generated by the power-modulation current setter 1032 are output to the current data selector 104.

The current data selector 104 selects any one of the plurality of current setting values (the normal-light-intensity data and the high-light-intensity data) output from the application current setter 103 based on the power-modulation control signal fed from the pulse generator 102. The current data selector 104 outputs the selected light intensity data, which is either the normal-light-intensity data or the high-light-intensity data, to the light source driver 3224 as light-source-application-current data.

The light source driver 3224 drives each of the light sources 2200a, 2200b, 2200c, and 2200d in accordance with the light-source-application-current data (current setting value) fed from the current data selector 104 and the light-source-modulation pulse signal (on-off modulation signal) fed from the pulse generator 102.

The light source driver 3224, which receives the light-source-modulation pulse signal and the light-source-application-current data and drives the light sources 2200a, 2200b, 2200c, and 2200d, is described in detail below.

Figure 10:
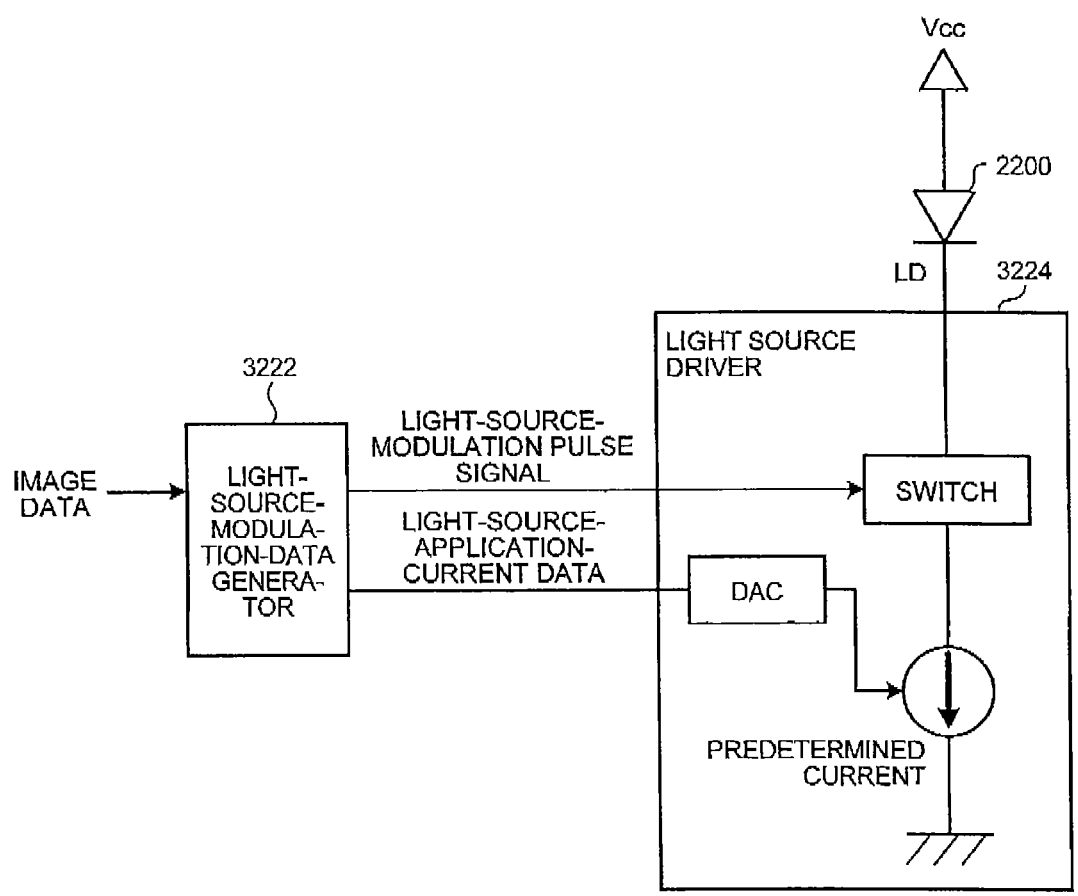
FIG. 10 is a block diagram schematically illustrating an example configuration of a light source driver.

FIG. 10 is a block diagram schematically illustrating an example configuration of the light source driver 3224. In FIG. 10, for simplicity of description, a single laser (LD (laser diode)) is used as the light source. However, in practice, the light source may alternatively be either an LDA (laser diode array) or a VCSEL (vertical-cavity surface-emitting laser).

As illustrated in FIG. 10, the light source driver 3224 includes a current source configured to supply an injection current to the LD of the light source (2200a, 2200b, 2200c, 2200d) in accordance with the light-source-modulation pulse signal and the light-source-application-current data. It is assumed that the light-source-application-current data is digitally configurable using a DAC (digital-to-analog converter) code. Light emission control in a desired light-on/off pattern is enabled by switching on and off the current source in accordance with the light-source-modulation pulse signal.

Figure 11:
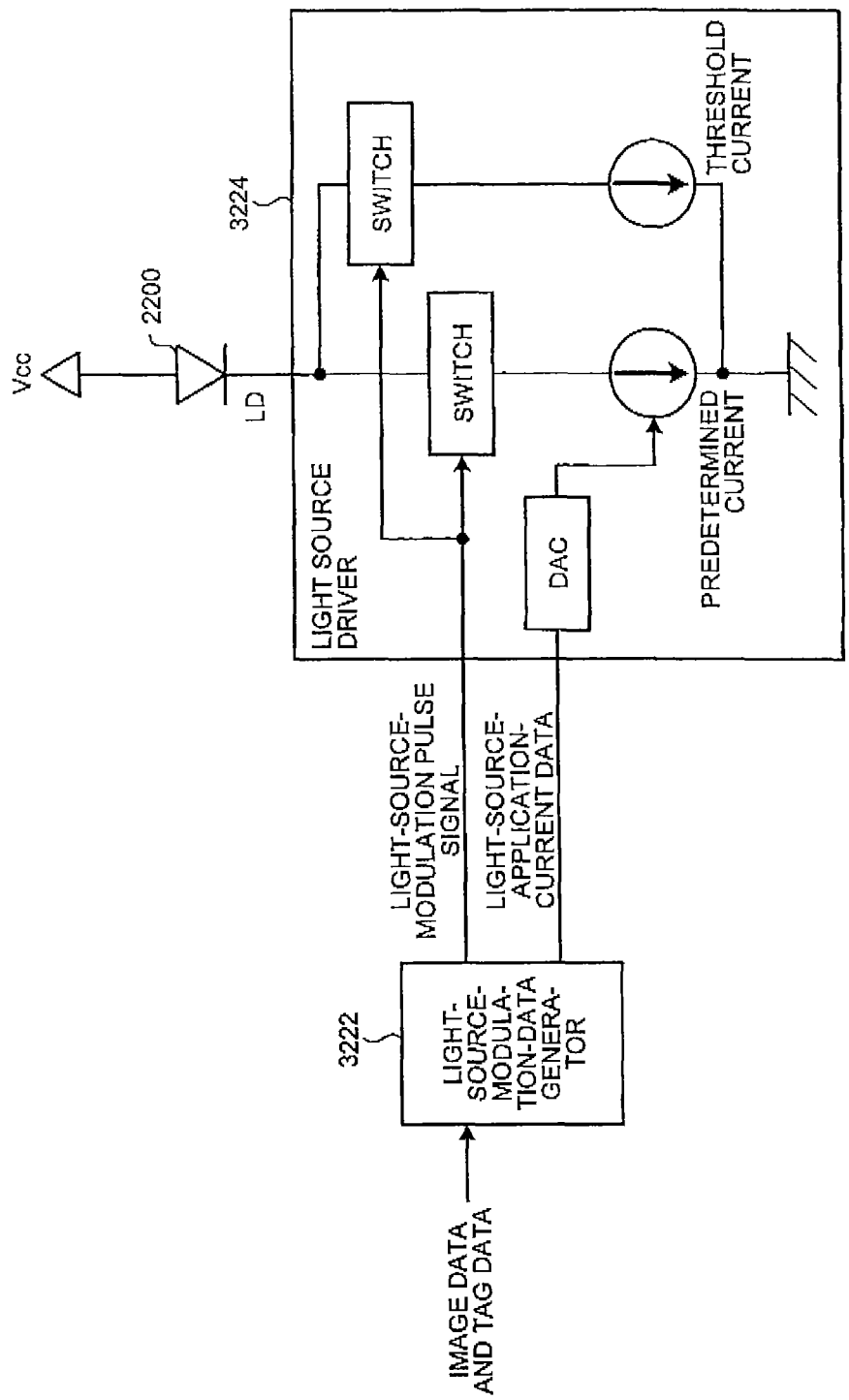
FIG. 11 is a block diagram schematically illustrating another example configuration of the light source driver.

FIG. 11 is a block diagram schematically illustrating another example configuration of the light source driver 3224. A circuit including a current source for applying a threshold current of the light source (2200a, 2200b, 2200c, 2200d) is illustrated in the example configuration of FIG. 11. With the configuration illustrated in FIG. 11, application of the threshold current as an additional current makes it possible to set the power modulation current output from the light-source-modulation-data generator 3222 so as to be accurately magnified.

Figure 12:
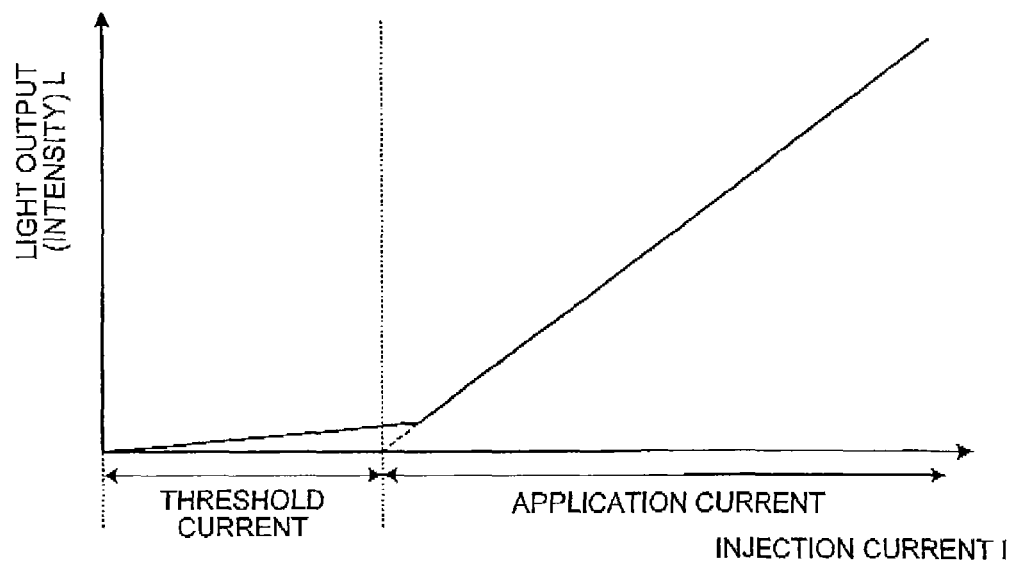
FIG. 12 is a graph of an injection-current vs. light-output curve obtained from the light source driver configured as illustrated in FIG. 11.

FIG. 12 is a graph of an injection-current vs. light-output (I-L) curve obtained from the light source driver 3224 configured as illustrated in FIG. 11. As illustrated in FIG. 12, applying the threshold current as an additional current makes it possible to increase light intensity at a constant rate to an increase in applied current. Accordingly, the power modulation current output from the light-source-modulation-data generator 3222 can be set so as to be accurately magnified.

Figure 13:
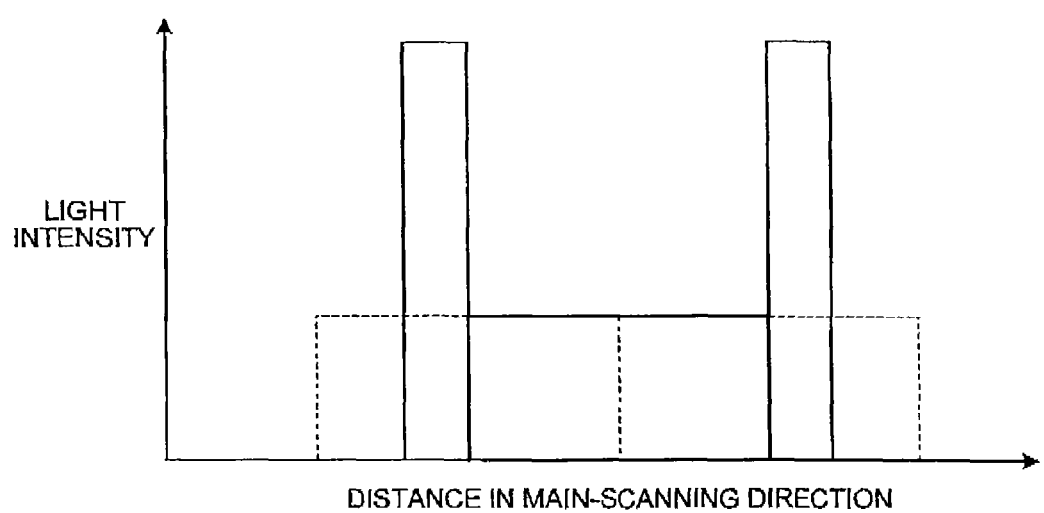
FIG. 13 is a graph illustrating a light waveform in an example of light emission control in the light source driver.
Figure 14:
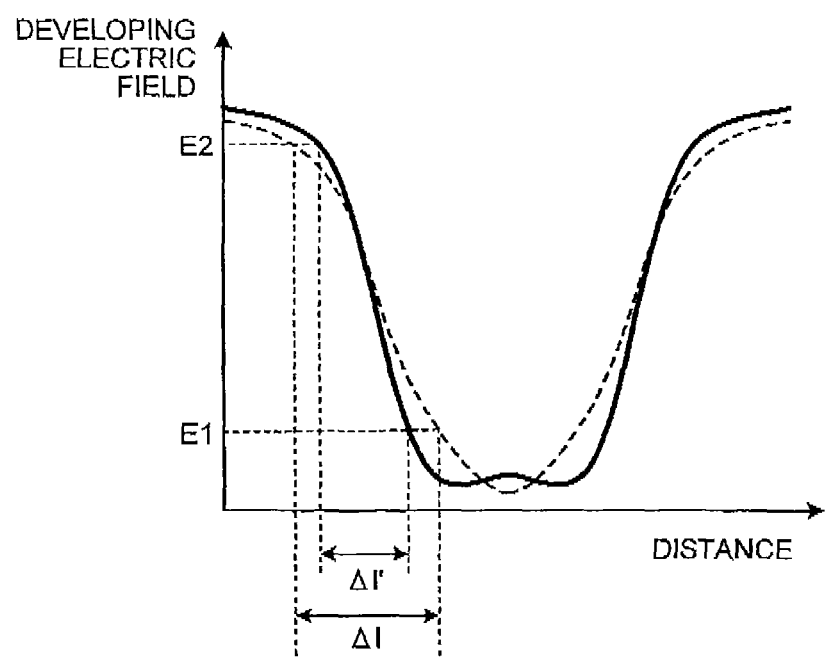
FIG. 14 is a graph illustrating a developing electric field associated with the light waveform illustrated in FIG. 13.

FIG. 13 is a graph illustrating a light waveform obtained by applying an example of light emission control to the light source driver 3224. FIG. 14 is a graph illustrating a developing electric field associated with the light waveform illustrated in FIG. 13. The light waveform illustrated in FIG. 13 obtained with the light source driver 3224 is obtained by performing, by the light-source-modulation-data generator 3222, a resolution increasing process and power modulation on pixels in a target region (in this example, edge portions) when tag data is added by the tag-generating-adding part 3220 of the image processing unit 3023. Referring to the light waveform illustrated in FIG. 13, thinning is performed by trimming pixels constituting edges in the image at the second resolution, and light intensity in the predetermined high light intensity pixel area at new edges after thinning is higher than a given light intensity. The light waveform indicated by dotted lines in FIG. 13 indicates a light waveform obtained using a normal method. The developing electric field indicated by a dashed line in FIG. 14 indicates a developing electric field associated with the light waveform obtained using the normal method.

It is possible to cause the developing electric field to increase and decrease sharply as illustrated in FIG. 14 by causing the light intensity to have such a light waveform as that illustrated in FIG. 13, in which the light intensity in the predetermined high light intensity pixel area at new edges after thinning is higher than the given light intensity. More specifically, as illustrated in FIG. 14, because an area (the area between E1 and E2) where electric field is weak and toner deposition is unstable is reduced to $\Delta1'(<\Delta1)$, the area where toner deposition is unstable can be reduced as compared with the normal method.

As a result, because unevenness in toner deposition is reduced, stability in toner density of a printout and edge sharpness of line images can be advantageously increased. Furthermore, because the pulse width is narrowed, an appropriate amount of exposure energy can be maintained without excessively increasing total exposure energy.

Figure 15:
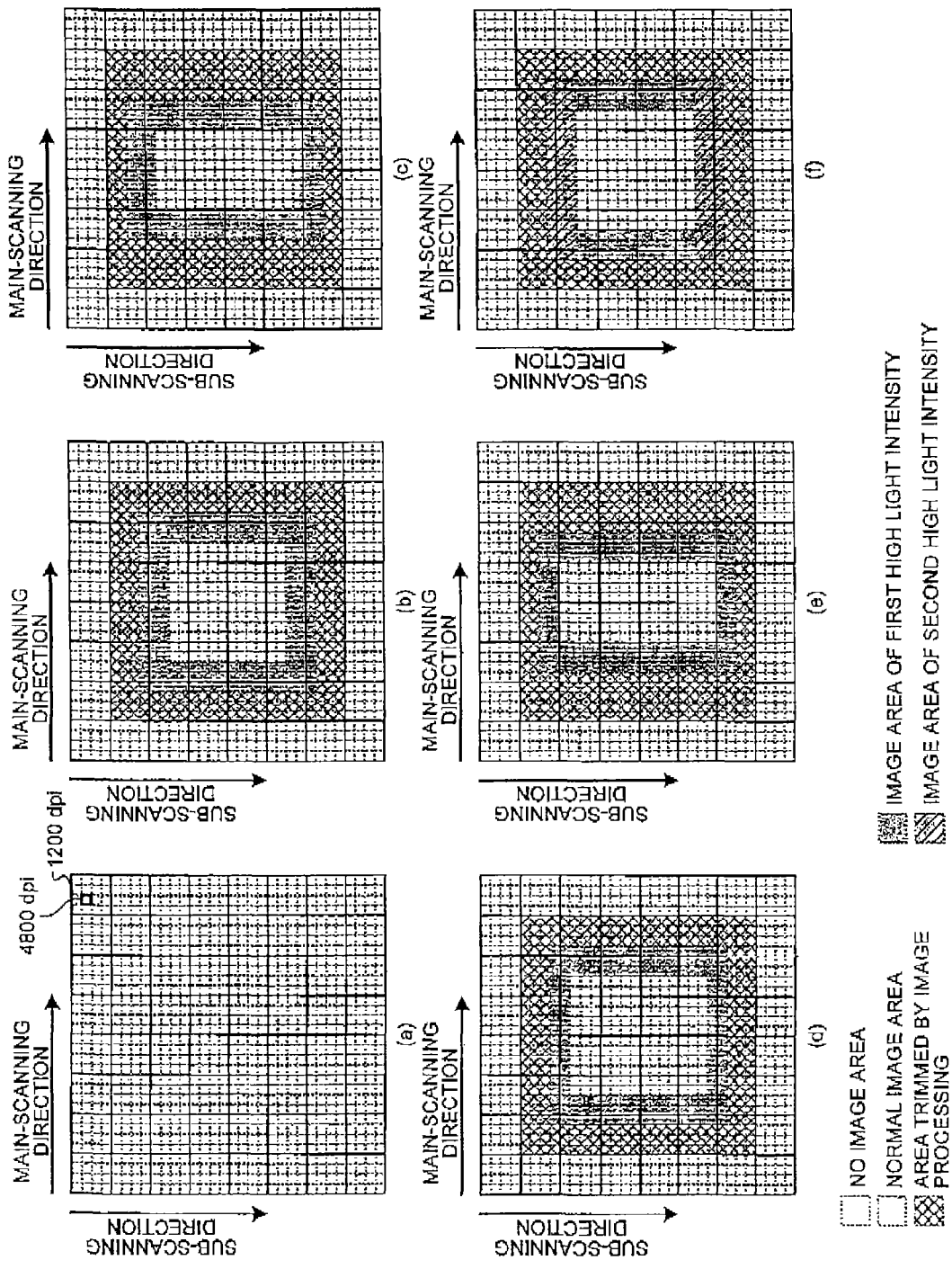
FIG. 15 is a diagram illustrating image processing examples.

Here, FIG. 15 is a diagram illustrating image processing examples. FIG. 15 illustrates, at (a), an example of image data before the second image processing by the resolution converter 101. In the examples of image data illustrated in FIG. 15, the grid of the solid lines correspond to 1200 dpi and the grid of the dotted lines correspond to 4800 dpi.

FIG. 15 illustrates, at (b), an example of image data after the second image processing by the resolution converter 101. In the example of the image data illustrated at (b) in FIG. 15, edge portions in the image are subjected to thinning (trimmed) by the width of 3 dots at 4800 dpi. Further, in the example of the image data illustrated at (b) in FIG. 15, the width of 3 dots at 4800 dpi inside the edge portions in the image is made to be the high light intensity area.

FIG. 15 illustrates, at (c), another example of image data after the second image processing by the resolution converter 101. In the example of the image data illustrated at (c) in FIG. 15, the degree of thinning in the vertical direction is made different from the degree of thinning in the horizontal direction as compared with the image data illustrated at (b) in FIG. 15. Specifically, in the example of the image data illustrated at (c) in FIG. 15, left and right edge portions in the image are subjected to thinning (trimmed) by the width of 5 dots at 4800 dpi. In the example of the image data illustrated at (c) in FIG. 15, upper and lower edge portions in the image are subjected to thinning (trimmed) by the width of 2 dots at 4800 dpi. Further, in the example of the image data illustrated at (c) in FIG. 15, the width of 3 dots at 4800 dpi inside the edge portions both in horizontal direction and vertical direction in the image is made to be the high light intensity area.

FIG. 15 illustrates, at (d), another example of image data after the second image processing by the resolution converter 101. In the example of the image data illustrated at (d) in FIG. 15, the high light intensity area in the horizontal direction is made different from the high light intensity area in the vertical direction as compared with the image data illustrated at (b) in FIG. 15. Specifically, in the example of the image data illustrated at (d) in FIG. 15, portions subjected to thinning are the same between the vertical direction and the horizontal direction and each have the width of 3 dots at 4800 dpi. Further, in the example of the image data illustrated at (d) in FIG. 15, the width of 3 dots at 4800 dpi inside the left and right edge portions in the image is made to be the high light intensity area. Furthermore, in the example of the image data illustrated at (d) in FIG. 15, the width of 2 dots at 4800 dpi inside the upper and lower edge portions in the image is made to be the high light intensity area.

FIG. 15 illustrates, at (e), another example of image data after the second image processing by the resolution converter 101. In the example of the image data illustrated at (e) in FIG. 15, the degree of thinning at left and right edges is made different from the degree of thinning at lower and upper edges, and the high light intensity area in the horizontal direction is made different from the high light intensity area in the vertical direction as compared with the image data illustrated at (b) in FIG. 15. Specifically, in the example of the image data illustrated at (e) in FIG. 15, the left and right edge portions in the image are subjected to thinning (trimmed) by the width of 5 dots at 4800 dpi. In the example of the image data illustrated at (e) in FIG. 15, the upper and lower edge portions in the image are subjected to thinning (trimmed) by the width of 2 dots at 4800 dpi. Furthermore, in the example of the image data illustrated at (e) in FIG. 15, the width of 3 dots at 4800 dpi inside the left and right edge portions in the image is made to be the high light intensity area. Furthermore, in the example of the image data illustrated at (e) in FIG. 15, the width of 2 dots at 4800 dpi inside the upper and lower edge portions in the image is made to be the high light intensity area.

FIG. 15 illustrates, at (f), another example of image data after the second image processing by the resolution converter 101. In the example of the image data illustrated at (f) in FIG. 15, power modulation information (the degree of high light intensity) in the high light intensity area inside upper and lower edges in the image is made different from that in the highlight intensity area inside left and right edges in the image as compared with the image data illustrated at (b) in FIG. 15. Specifically, in the example of the image data illustrated at (f) in FIG. 15, edge portions in the image are subjected to thinning (trimmed) by the width of 3 dots at 4800 dpi. Further, in the example of the image data illustrated at (f) in FIG. 15, the width of 3 dots at 4800 dpi inside the edge portions in the image is made to be the high light intensity area. In addition, power modulation information for the high light intensity area inside the left and right edges in the image is made to be the first power (200%, for example), and power modulation information for the high light intensity area inside the upper and lower edges in the image is made to be the second power (150%, for example).

As illustrated at (f) in FIG. 15, portions where the inside of the left and right edges overlaps the inside of upper and lower edges, the first power (200%, for example) that is the power modulation information for the high light intensity area inside the left and right edges in the image is prioritized.

As described above, the aspect ratio of the image can be adjusted by changing parameters (the degree of thinning, the area of high light intensity pixels, and/or the degree of the high light intensity) of image processing with respect to the left and right edge portions in the image and the upper and lower edge portions in the image. That is, according to the present embodiment, the occurrence of the distortion of the aspect ratio of characters and shapes of minute sizes deriving from the developing process can be reduced.

The parameters (the degree of thinning, the area of high light intensity pixels, and/or the degree of the high light intensity) of image processing with respect to the left and right edge portions in the image and the upper and lower edge portions in the image may be configured to be adjusted based on a density value obtained by the density detector 2245 detecting a toner image formed on the transfer belt 2040. For example, toner images of a vertical line pattern and a horizontal line pattern are formed on the transfer belt 2040, and in accordance with the density difference in the toner images, the parameters (the degree of thinning, the area of high light intensity pixels, and/or the degree of the high light intensity) of image processing with respect to the left and right edge portions in the image and the upper and lower edge portions are set.

As described above, according to the first embodiment, image processing can be performed at a resolution higher than a data resolution with a data transfer rate for data transfer to the light-source-modulation-data generator 3222 remained low. Because image processing at the higher resolution can be performed without increasing the transfer rate, an increase in cost involved in increasing the data transfer rate can be reduced. Furthermore, the tag-generating-adding part 3220 of the image processing unit 3023 generates and transfers tag data for each pixel, on which image processing is to be performed, and the light-source-modulation-data generator 3222 performs thinning. Accordingly, the high-resolution process can be performed while reducing increase in cost. Furthermore, by performing exposure power control simultaneously, shortage in energy in processing in a minute region can be prevented. Put another way, the light-source-modulation-data generator 3222 performs image processing using the tag data added by the tag-generating-adding part 3220 of the image processing unit 3023 while simultaneously performing exposure power control. Accordingly, image processing to be performed by the light-source-modulation-data generator 3222 can be simple and highly dense. By performing thinning and exposure power control simultaneously, processing can be performed while reliably providing necessary exposure energy even to image formation for a minute region. Thus, high image quality can be achieved.

Figure 16:
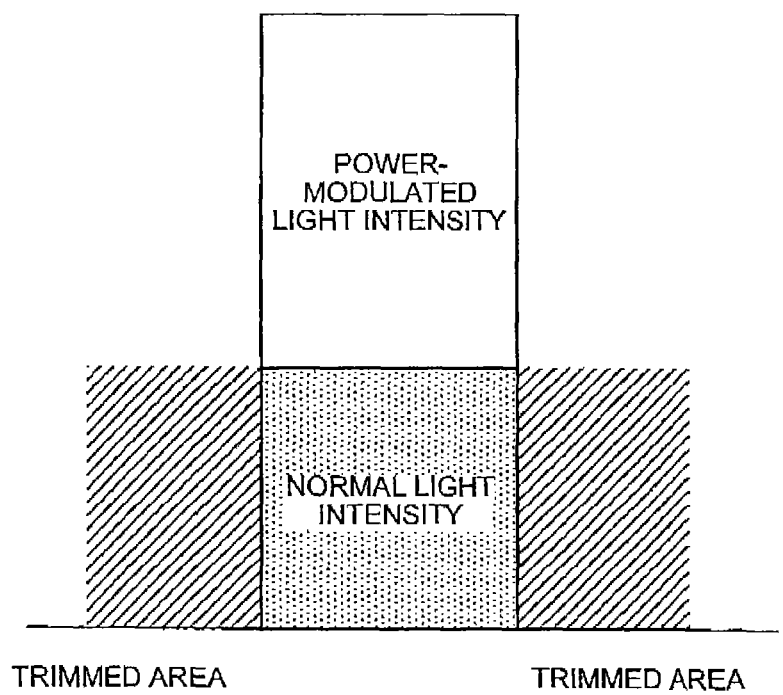
FIG. 16 is a diagram illustrating an example, in which a loss in integral of light intensity caused by thinning is substantially equalized with an increase in integral of light intensity caused by power modulation.

As illustrated in FIG. 16, the resolution converter 101 may be configured to substantially equalize a loss in integral of light intensity caused by thinning with an increase in integral of light intensity caused by power modulation when the exposure intensity for the high light intensity pixel area at the new edges after the thinning in the second image processing is changed.

Second Embodiment

A second embodiment is described with reference to FIG. 17. Elements identical to those of the above-described first embodiment are denoted by the same reference numerals, and repeated description may be omitted. The second embodiment differs from the first embodiment in configuration of a resolution converter 105 of the light-source-modulation-data generator 3222.

Figure 17:
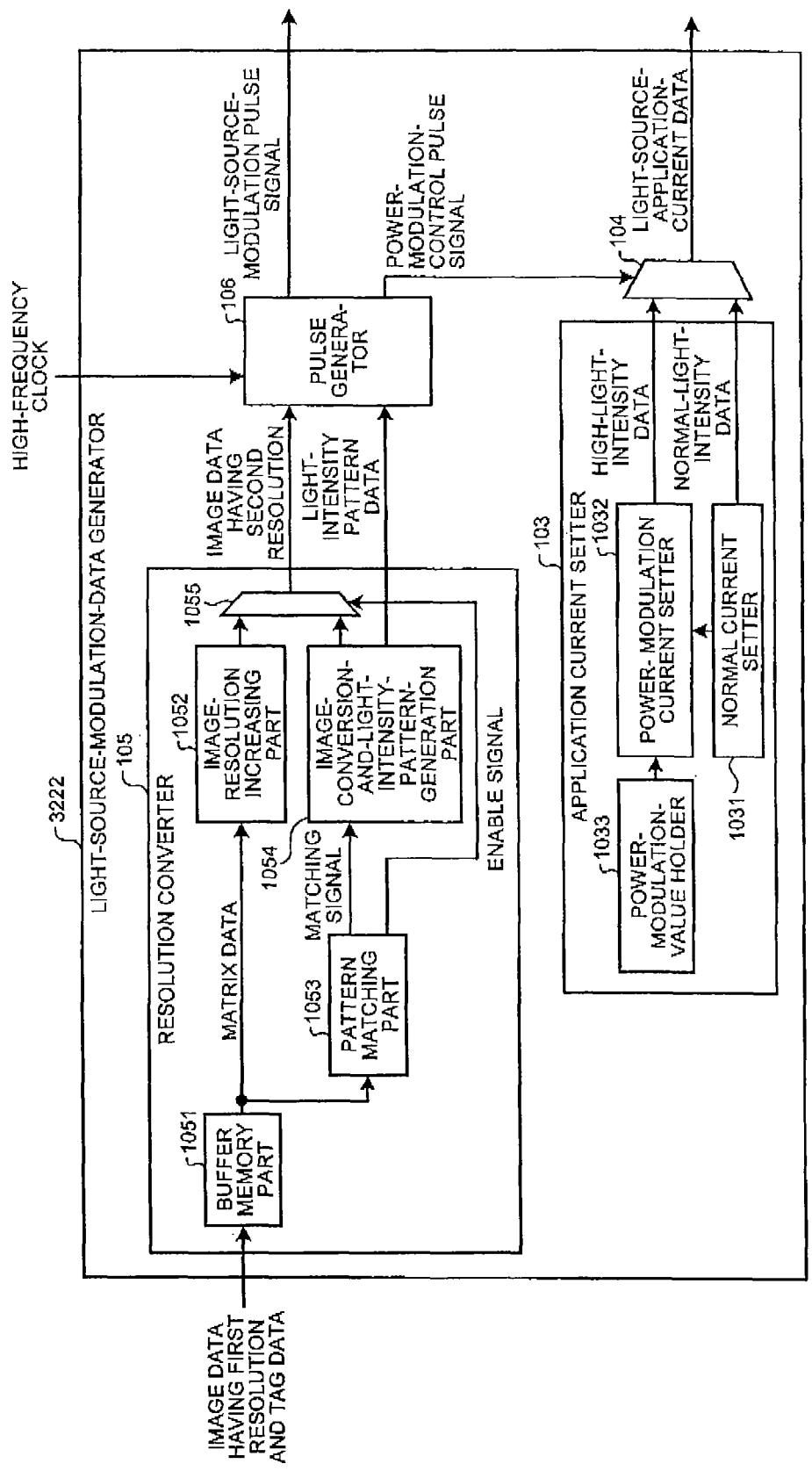
FIG. 17 is a block diagram schematically illustrating a configuration of the light-source-modulation-data generator according to a second embodiment.

FIG. 17 is a block diagram schematically illustrating a configuration of the light-source-modulation-data generator 3222 according to the second embodiment. As illustrated in FIG. 17, the light-source-modulation-data generator 3222 includes, in lieu of the resolution converter 101 and the pulse generator 102 illustrated in FIG. 9, the resolution converter 105 and a pulse generator 106.

The resolution converter 105 includes a buffer memory part 1051, an image-resolution increasing part 1052, which is a first image-resolution increasing part, a pattern matching part 1053, an image-conversion-and-light-intensity-pattern-generation part 1054, which is a second image-resolution increasing part, and a selector 1055.

The buffer memory part 1051 receives 2,400 dpi, 1-bit data fed from the image processing unit 3023 and stores a plurality of main-scanning lines of the data. The buffer memory part 1051 passes the stored data downstream in response to data reading performed by a downstream data processor (in this example, the image-resolution increasing part 1052 and the pattern matching part 1053). At this stage, the image data is in the form of a 2,400 dpi, 1-bit signal. The output of the buffer memory part 1051 is fed to the image-resolution increasing part 1052 and the pattern matching part 1012.

In contrast to the image-resolution increasing part 1013 of the first embodiment, the image-resolution increasing part 1052 simply increases the resolution (to 4,800 dpi, for example) of a pixel output from the buffer memory part 1051, thereby dividing the pixel into a 2×2 block. The image-resolution increasing part 1013 outputs high-resolution image data, the resolution of which is increased, to the selector 1055.

The pattern matching part 1053 detects a target pixel, on which image processing is to be performed, in the signal representing the 2,400 dpi, 1-bit image dots by pattern detection using an image matrix. If tag data indicating image data attribute is given, the pattern matching part 1012 performs the detection by performing pattern matching on a necessary image area, which is indicated by the image attribute. Examples of the image attribute include "text", "picture", and "shape". Thereafter, the pattern matching part 1012 outputs a matching signal indicating a pattern, with which pattern match is detected, to the image-conversion-and-light-intensity-pattern-generation part 1054. The pattern matching part 1012 also outputs an enable signal, which is to be asserted when there is a pattern match, to the selector 1055.

The image-conversion-and-light-intensity-pattern-generation part 1054 outputs high-resolution image data whose resolution is increased to the second resolution based on the matching signal fed from the pattern matching part 1012 to the selector 1055. The image-conversion-and-light-intensity-pattern-generation part 1054 also outputs light-intensity pattern data, which is based on the matching signal fed from the pattern matching part 1012, to the pulse generator 106. The light-intensity pattern data is data indicating pixels, light intensity of which is to be modulated at the second resolution.

The selector 1055 selects either the high-resolution image data output from the image-resolution increasing part 1052 or the high-resolution image data, which is output from the pattern matching part 1053 and whose resolution is increased to the second resolution. If an enable signal, which is to be asserted when there is a pattern match, is fed to the selector 1055, the selector 1055 selects the high-resolution image data, which is output from the pattern matching part 1053 and whose resolution is increased to the second resolution.

The pulse generator 106 generates a light-source-modulation pulse signal, which is an on-off modulation signal in accordance with the high-resolution image data whose resolution is increased to the second resolution, and a power-modulation-control pulse signal, which is an application-current switching signal.

More specifically, the pulse generator 106 converts the high-resolution image data and the power modulation information into serial signals based on a high-frequency clock (basic clock, from which pulse signals are generated) and outputs the converted signals as the light-source-modulation pulse signal and the power-modulation control signal, respectively. The pulse signals are serial signals and the high (H) period and low (L) period of the pulse signals indicate On-off timing and switching timing. The pulse generator 106 outputs the light-source-modulation pulse signal to the light source driver 3224. The pulse generator 106 outputs the power-modulation control signal to the current data selector 104. The power-modulation control signal serves as a switching signal for selecting, by the current data selector 104, either normal-light-intensity data or high-light-intensity data. In this example, the H period of the pulse signal corresponds to a high-light-intensity period, while the L period of the pulse signal corresponds to a normal-light-intensity period.

The resolution converter 105 of the second embodiment simply increases resolution of image data (to 4,800 dpi, for example) in this manner. Simultaneously, if tag data indicating image data attribute is given and if there is a matching pattern, the light-source-modulation-data generator 3222 generates, in addition to light-intensity pattern data, high-resolution image data whose resolution is increased to the second resolution. If there is a pattern match, the light-source-modulation-data generator 3222 selects the high-resolution image data whose resolution is increased to the second resolution.

Thus, according to the second embodiment, if tag data is not given, only simply increasing resolution of image data to a higher resolution (to 4,800 dpi, for example) is performed. Accordingly, processing speed of resolution conversion performed by the resolution converter 105 can be increased.

According to an embodiment, image processing can be performed at a resolution higher than a data resolution with a data transfer rate for data transfer to a light-source-modulation-data generator, which generates data for driving a light source of an optical scanning device, remained low. Accordingly, an increase in cost involved in increasing the data transfer rate can be reduced. Furthermore, because image processing by the light-source-modulation-data generator is performed based on tag data in an image processing unit and, furthermore, exposure power control is performed simultaneously, image processing in the light-source-modulation-data generator can be simple and highly dense. By performing thinning and exposure power control simultaneously, processing can be performed while reliably providing necessary exposure energy even to a minute region. As a result, high image quality can be achieved.

Further, according to an embodiment, the fine adjustment of the aspect ratio of the image is made possible by allowing setting of at least one of the degree of thinning, the high light intensity pixel area and the exposure intensity, individual with respect to the left and right edges in the horizontal direction of the image and the upper and lower edges in the vertical direction of the image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
an image processor configured to perform first image processing on image data having a first resolution and to add tag data to a target pixel, the target pixel being a pixel where second image processing is to be performed;
a resolution converter configured to convert the image data having the first resolution into image data having a second resolution, the second resolution being higher than the first resolution, and to perform the second image processing based on arrangement of the image data having the first resolution and the tag data, both output from the image processor;
a pulse generator configured to generate an on-off modulation signal and an application-current switching signal in accordance with the image data having undergone the second image processing;
an application current setter configured to output a current setting value for an electric current to be applied to a light source; and
a light source driver configured to drive the light source in accordance with the current setting value and the on-off modulation signal, the current setting value being output depending on the application-current switching signal.

2. The image forming apparatus according to claim 1, wherein
the application current setter is capable of outputting a plurality of current setting values, and
the light source driver acquires a current setting value from the application current setter in accordance with the application-current switching signal.

3. The image forming apparatus according to claim 1, wherein the resolution converter includes
a pattern matching part configured to determine whether or not the target pixel is a pixel belonging to an edge in an image based on arrangement of the image data having the first resolution and the tag data in an image matrix, the image matrix being the image data having the first resolution and the tag data in a region containing the target pixel and a pixel around the target pixel, and
an image-resolution increasing part configured to covert the pixel detected by the pattern matching part as belonging to the edge in the image to image data having the second resolution.

4. The image forming apparatus according to claim 1, wherein the resolution converter includes
a first image-resolution increasing part configured to increase resolution of the target pixel, the target pixel being sequentially selected from the image data having the first resolution,
a pattern matching part configured to determine whether or not the target pixel is a pixel belonging to an edge in an image based on arrangement of the image data having the first resolution and the tag data in an image matrix, the image matrix being the image data having the first resolution and the tag data in a region containing the target pixel and a pixel around the target pixel,
a second image-resolution increasing part configured to covert the pixel detected by the pattern matching part as belonging to an edge in an image into image data having the second resolution, and
a selector configured to select the image data having the second resolution when the target pixel is determined as being the pixel belonging to the edge in the image and output selected image data to the pulse generator, but select image data having the first resolution when the target pixel is determined as not being the pixel belonging to the edge in the image.

5. The image forming apparatus according to claim 3, wherein the resolution converter trims a pixel constituting an edge in the image at the second resolution to perform thinning in the second image processing.

6. The image forming apparatus according to claim 5, wherein
the resolution converter generates power modulation information for changing exposure intensity for high light intensity pixel area to be exposed with light intensity higher than normal, at new edges after the thinning in the second image processing, and
the pulse generator generates the on-off modulation signal and the application-current switching signal in accordance with the image data having the second resolution and the power modulation information.

7. The image forming apparatus according to claim 6, wherein the resolution converter can set at least one of a degree of thinning being a trimming amount of the pixel, the high light intensity pixel area and the exposure intensity, individually with respect to left and right edges in a horizontal direction of the image, and upper and lower edges in a vertical direction of the image.

8. The image forming apparatus according to claim 1, wherein
the application current setter includes
a normal current setter configured to generate normal-light-intensity data, and
a power-modulation current setter configured to generate high-light-intensity data by magnifying the normal-light-intensity data generated by the normal current setter, and
the application current setter outputs either the normal-light-intensity data or the high-light-intensity data to the light source while switching therebetween in accordance with the application-current switching signal generated by the pulse generator.

9. The image forming apparatus according to claim 6, wherein when the exposure intensity for the high light intensity pixel area at the new edges after the thinning in the second image processing is changed, the resolution converter sets the exposure intensity so as to equalize an increase in integral of light intensity caused by changing the exposure intensity with a loss in integral of light intensity caused by the second image processing.

10. A method for driving a light source in an image forming apparatus, the method comprising:
performing image processing to perform first image processing on image data having a first resolution and add tag data to a target pixel, the target pixel being a pixel where second image processing is to be performed;
performing resolution conversion to convert the image data having the first resolution into image data having a second resolution, the second resolution being higher than the first resolution, and perform the second image processing based on arrangement of the image data having the first resolution and the tag data;

performing pulse generation to generate an on-off modulation signal and an application-current switching signal in accordance with the image data having undergone the second image processing;

setting an application current by outputting a current setting value for an electric current to be applied to the light source; and driving the light source in accordance with the current setting value and the on-off modulation signal, the current setting value being output depending on the application-current switching signal.

\* \* \* \* \*